United States Patent
Bong et al.

(10) Patent No.: US 7,055,741 B2
(45) Date of Patent: *Jun. 6, 2006

(54) SYSTEMS AND METHODS OF INVENTORY MANAGEMENT UTILIZING UNATTENDED FACILITIES

(75) Inventors: Juwono W. Bong, Lawrenceville, GA (US); Clyde W. Knowles, Woodstock, GA (US); Douglas David Fratt, Cumming, GA (US); Robert F. Joyce, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/018,789

(22) Filed: Dec. 20, 2004

(65) Prior Publication Data
US 2005/0103842 A1    May 19, 2005

Related U.S. Application Data

(63) Continuation of application No. 10/401,915, filed on Mar. 28, 2003, now Pat. No. 6,845,909, which is a continuation-in-part of application No. 10/285,115, filed on Oct. 31, 2002, now Pat. No. 6,866,195.

(51) Int. Cl.
*G06K 7/01* (2006.01)
(52) U.S. Cl. .................. 235/382.5; 235/383; 235/382; 235/385; 706/26
(58) Field of Classification Search ............. 235/382.5, 235/383, 382; 705/26
See application file for complete search history.

(56) References Cited

U.S. PATENT DOCUMENTS 4,635,053 A    1/1987    Banks et al.
4,636,634 A    1/1987    Harper et al.

(Continued)

FOREIGN PATENT DOCUMENTS

JP    405274597 A    10/1993

(Continued)

OTHER PUBLICATIONS

SmarteCarte, http://www.smartecarte.com/lockers/laptop.html Accessed in Sep. 2002. Applicants make no admission that this reference constitutes prior art.

(Continued)

*Primary Examiner*—Steven S. Paik
(74) *Attorney, Agent, or Firm*—Alston & Bird, LLP

(57) ABSTRACT

An inventory management system utilizes unattended facilities remote from a central warehouse for service parts logistics. Items are placed in inventory in secure enclosures at the unattended facilities by the inventory management service or are delivered directly to the unattended facility. The unattended facilities may be located near one or more customers to reduce a service technician's travel time and customers' inventory costs. A service technician utilizes a passcode to retrieve needed items. The service technician may order items that are not kept in the inventory of the unattended facility in which case the items may be delivered to the unattended facility and the service technician may receive a notification related to all the items that comprise an order that the order is ready for pick up at an unattended facility. Unused, used or damaged parts may be returned by a technician to a remote secure enclosure where such returned parts may be retrieved and disposed of, repaired or placed back into inventory if not damaged or after repair, and the processing of such returned parts begins by information entered into a data entry device at the remote secure enclosure location. Return items that are not damaged may be included in the inventory of an unattended facility.

46 Claims, 18 Drawing Sheets

U.S. PATENT DOCUMENTS

| | | | |
|---|---|---|---|
| 4,698,630 A | 10/1987 | Ellsberg | |
| 4,803,348 A | 2/1989 | Lohrey et al. | |
| 4,894,717 A | 1/1990 | Komei | |
| 4,961,507 A | 10/1990 | Higgins | |
| 5,057,677 A | 10/1991 | Bertagna et al. | |
| 5,091,713 A | 2/1992 | Horne et al. | |
| 5,126,732 A | 6/1992 | Mardon | |
| 5,169,222 A | 12/1992 | Bellore et al. | |
| 5,205,436 A | 4/1993 | Savage | |
| 5,206,637 A | 4/1993 | Warren | |
| 5,223,829 A | 6/1993 | Watabe | |
| 5,231,272 A | 7/1993 | Mardon | |
| 5,386,462 A | 1/1995 | Schlamp | |
| 5,455,409 A | 10/1995 | Smith et al. | |
| 5,475,378 A | 12/1995 | Kaarsoo et al. | |
| 5,509,572 A | 4/1996 | Curtis | |
| 5,774,053 A | 6/1998 | Porter | |
| 5,979,750 A | 11/1999 | Kindell | |
| 6,010,064 A | 1/2000 | Umeda et al. | |
| 6,010,239 A | 1/2000 | Hardgrave et al. | |
| 6,028,517 A | 2/2000 | Sansone et al. | |
| 6,123,223 A | 9/2000 | Watkins | |
| 6,230,971 B1 | 5/2001 | Matsumoto et al. | |
| 6,300,873 B1 | 10/2001 | Kucharczyk et al. | |
| 6,323,782 B1 | 11/2001 | Stephens et al. | |
| 6,344,796 B1 | 2/2002 | Ogilvie et al. | |
| 6,418,416 B1 | 7/2002 | Rosenberg et al. | |
| 6,422,457 B1 | 7/2002 | Frich et al. | |
| 6,536,659 B1 | 3/2003 | Hauser et al. | |
| 6,648,153 B1 | 11/2003 | Homes | |
| 6,690,997 B1 | 2/2004 | Rivalto | |
| 6,882,269 B1 * | 4/2005 | Moreno | 340/5.73 |
| 2001/0017507 A1 | 8/2001 | Hara | |
| 2001/0032443 A1 | 10/2001 | Tiley et al. | |
| 2001/0034673 A1 | 10/2001 | Yang et al. | |
| 2001/0042024 A1 | 11/2001 | Rogers | |
| 2001/0050615 A1 | 12/2001 | Kucharczyk et al. | |
| 2002/0032501 A1 | 3/2002 | Tilles et al. | |
| 2002/0035515 A1 | 3/2002 | Moreno | |
| 2002/0042665 A1 | 4/2002 | Kakuta | |
| 2002/0067261 A1 | 6/2002 | Kucharczyk et al. | |
| 2002/0077937 A1 | 6/2002 | Lyons et al. | |
| 2002/0107744 A1 | 8/2002 | Rosenberg et al. | |
| 2002/0107820 A1 | 8/2002 | Huxter | |
| 2002/0116289 A1 | 8/2002 | Yang | |
| 2002/0118111 A1 | 8/2002 | Brown et al. | |
| 2002/0128957 A1 | 9/2002 | Rosenberg et al. | |
| 2002/0153994 A1 | 10/2002 | Bonner et al. | |
| 2002/0175606 A1 | 11/2002 | Holmes | |
| 2002/0177922 A1 | 11/2002 | Bloom | |
| 2003/0040980 A1 | 2/2003 | Nakajima et al. | |

FOREIGN PATENT DOCUMENTS

| | | |
|---|---|---|
| JP | 411104005 A | 4/1999 |
| WO | WO 01/99037 A1 | 12/2001 |
| WO | WO200207021 A2 | 1/2002 |

OTHER PUBLICATIONS

Far East Lockers, http://www.fargogroup.com/gb/east_lockers/download/Logibag_lockers_GB.PDF Accessed in Sep. 2002. Applicants make no admission that this reference constitutes prior art.

* cited by examiner

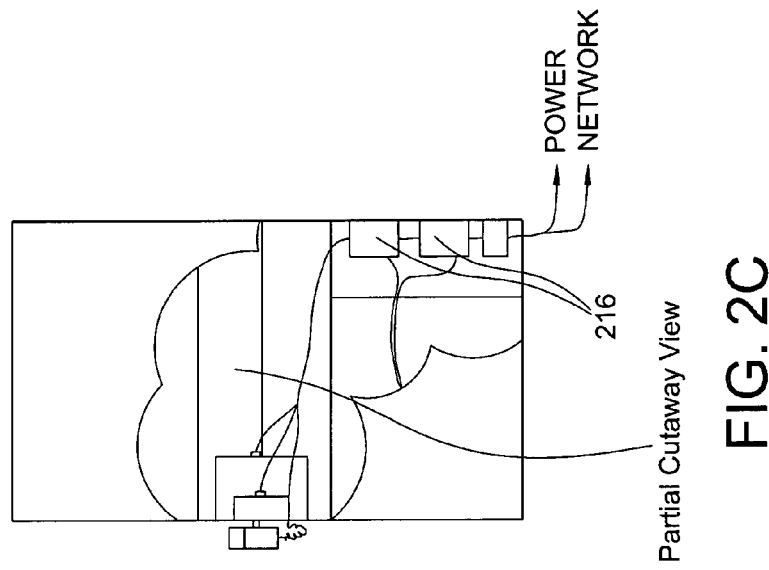
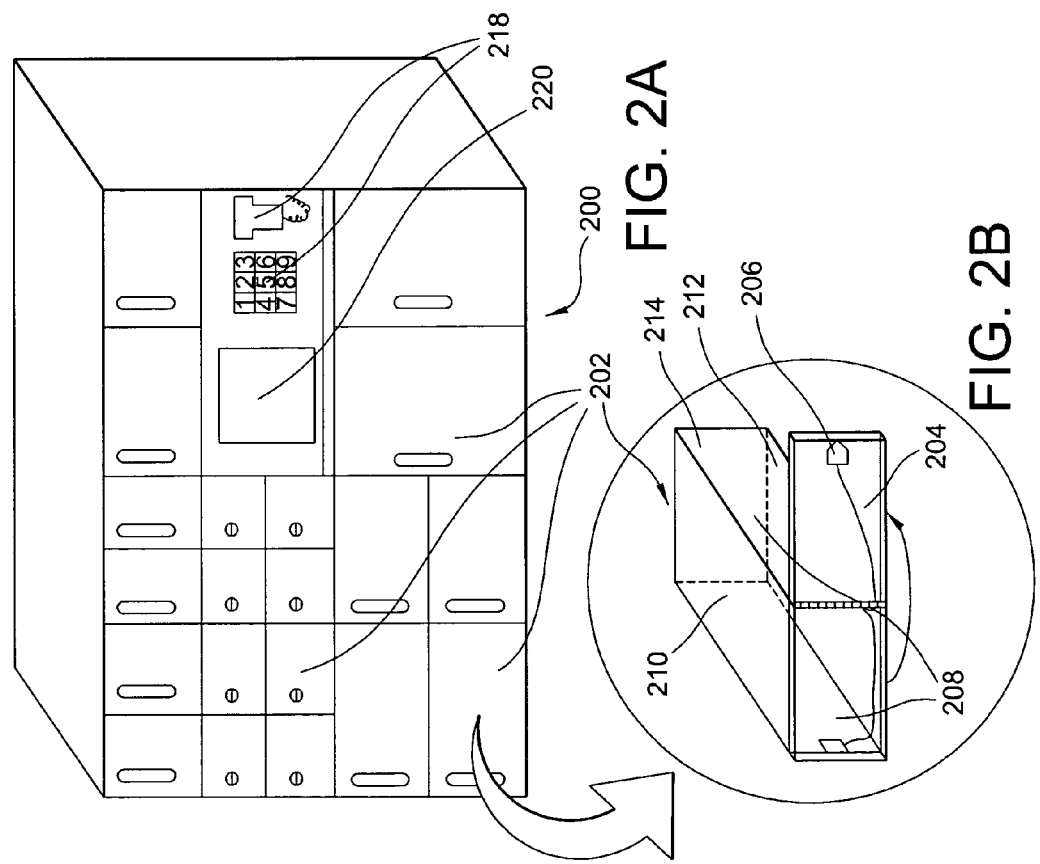

SYSTEMS AND METHODS OF INVENTORY MANAGEMENT UTILIZING UNATTENDED FACILITIES

CROSS-REFERENCE TO RELATED APPLICATIONS

This application is a continuation of U.S. application Ser. No. 10/401,915, filed Mar. 28, 2003, now U.S. Pat. No. 6,845,909, which is a continuation-in-part of U.S. patent application Ser. No. 10/285,115, filed on Oct. 31, 2002, now U.S. Pat. No. 6,866,195, both of which are hereby incorporated herein in their entirety by reference.

BACKGROUND OF THE INVENTION

1. Field of the Invention

The present invention relates generally to inventory management utilizing unattended secure facilities and more particularly to systems and methods for the distribution of service parts from a supplier to a user and for the return of parts from the user to a supplier or other entities utilizing unattended facilities.

2. Description of the Related Art

Technicians (such as computer repair technicians) often require new parts in order to complete a particular repair. Inventory management services were developed to supply technicians with parts. Generally, in the past, when a technician needed a new part, the worker would request the part from a warehouse, travel to the warehouse, pick up the part at an attended distribution counter within the warehouse, travel to the place where the part was needed, and then install the part. In other instances, the part may be ordered and upon arrival "cross-docked" at a facility controlled by an inventory management service and be picked up at the facility by the technician. In some instances, ordered parts may be held for pick-up at an attended inventory management service facility. In yet other instances, the inventory management service may have the ordered part couriered to the technician.

The parts distribution methods described above have several drawbacks. First, these methods may require technicians to travel to a warehouse each time they need a new part, which can be inconvenient and time consuming. Alternatively, a courier picking up the required part from a warehouse and meeting the technician at a designated location may cause added courier costs and delay time while the technician waits to meet the courier. Moreover, if the courier and the technician fail to meet, it may cause a service failure. Second, the parts distribution method described above only allows technicians to pick up parts when the attended warehouse is staffed and open for business or requires extra expense or extraordinary arrangements for "after-hours" pickup. Third, because the warehouses are often busy, technicians often have to wait in line before receiving their requested parts from a warehouse representative, thus further delaying the repair.

To address some of the problems with the parts distribution method described above, system and methods were devised for technicians to pick up parts at an attended warehouse by providing a set of lockers that can be used for distributing parts without the assistance of a warehouse representative. Typically, after a technician calls such a company to request a certain part, a warehouse worker places the requested part into an unattended locker. The locker may be within a computer-controlled bank of secure lockers. When the technician arrives at the bank of lockers, the worker preferably uses a keypad at the bank of lockers to enter access information (e.g., the technician's User ID, PIN, or an appropriate order number) into the bank of lockers. In response to the user entering the proper access information, the locker containing the technician's part is unlocked allowing the technician to pick up the requested part.

Although such locker systems reduced some problems with early warehouse part distribution systems (such as waiting in line and only being able to access the parts when the distribution center is staffed), there are still many problems associated with these systems. For example, these systems still require a user or a courier to travel to a warehouse to pick up the parts. In addition, they require warehouse workers to move parts from the warehouse to the lockers each time a part is ordered. Furthermore, such systems do not provide for a convenient method of allowing users to return damaged or unused parts or, if such parts are returned, the returning technician may need to obtain some form of authorization prior to dropping off the returned part at the unattended facility.

Other forms of unattended distribution systems are also known in the art. For instance, U.S. Pat. No. 6,010,064 issued on Jan. 4, 2000 to Umeda et al., ("the '064 patent"), generally discloses an unattended commodity distributing locker apparatus whereby commodities are dropped off by a customer, processed by a service company, and returned to the locker after processing by the service company. More specifically, the '064 patent contemplates a customer entering certain information into the system by either a keypad or a membership card. The system then prints a bar-coded label that is placed with the item in the locker. Upon pick up by the service company, the bar-coded label is scanned to identify the commodity. After processing, the items are returned to the locker system by the service company. The customer then enters the membership card or other personal information to retrieve the processed items from the lockers. By entering a membership card or certain personal information into the system the customer is associated with a processed item.

U.S. Pat. No. 6,344,796 issued on Feb. 5, 2002 to Ogilvie et al., ("the '796 patent"), discloses an unattended cross-docking system whereby local shippers can exchange custody of goods with regional or national shippers to achieve better transportation economics. The '796 patent provides for a facility and method that can be used by businesses and individuals for receipt and storage of goods without requiring them to be present at the time of delivery. It also provides a facility and method for businesses and individuals to leave goods for pick-up by a shipper. The system provides notification and an access code to a local shipper when items are left in storage. Such notification may be by voice message, fax or e-mail. Another embodiment of this reference discloses a system whereby the storage devices are placed at some convenient location along the routes where consumers drive home. This bank of storage devices serves as a depot to receive shipments from multiple vendors and permit pickup by consumers.

The above-described systems generally provide a one to one relationship where a technician will place an order for one or more parts, the order is delivered to an unattended facility by a shipper or parts service, depending upon the number and size of the parts associated with the order the parts may be placed in one or more secure unattended enclosures at the unattended facility and the technician receives a separate notification for each part that is placed in a separate enclosure. These multiple notifications for a single order are often inconvenient and confusing for the technician ordering the part as well as increasing the messaging traffic. The technician will then travel to the unattended secure location to retrieve the parts.

Unattended drop off facilities are secure facilities where parts that are intended to be returned to an inventory management service are placed until pick up by the inventory management service or its agents (i.e., commercial couriers, shippers or shipping services). When returning unused, used or damaged parts, some prior art systems generally required a technician to first await receipt of some form of authorization before placing the parts in an unattended drop off facility. An inventory management service generally receives the returned part in its warehouse before information about the returned part may be entered into its return parts system to begin the return parts processing.

Therefore, systems and methods are needed to address the challenges associated with expediting parts retrieval and parts return, notifying a technician that a part or order is ready to be picked up, decreasing a technician's travel time to retrieve or return a service part and expediting the processing of returned parts.

BRIEF SUMMARY OF THE INVENTION

Generally speaking, the present invention overcomes the challenges of the prior art by providing systems and methods for the unattended distribution of an inventory of parts from a supplier to a user and for the return of parts from the user to a supplier or other facility. The present invention utilizes remote secure enclosures in an unattended inventory management system for service parts logistics where items are placed in the compartments of the secure enclosures by an inventory management service, a courier or a shipping service. A single notification may be received by the technician that the items are ready for pick up and the items are then retrieved by the technician for the repair and or maintenance of the technicians' clients' equipment. Also provided are systems and methods of returning unused, used or damaged parts by a technician to a remote secure enclosure where such returned parts may be retrieved and disposed of, repaired or placed back into inventory if not damaged or after repair, and the processing of such returned parts begins by information entered into a data entry device at the remote secure enclosure location.

Unattended Inventory Facilities and Parts Pooling

The system includes a secure enclosure or area such as, for example, a set of secure lockers or a secure room or rooms (i.e., a remote unattended inventory facility) that are remote from one or more warehouses or field stocking locations. These secure remote unattended inventory facilities may be maintained at a convenient location (e.g., at a central location that is close to two or more customers, or on-site at a customer's offices). The ability to place the unattended facilities in such a convenient location accommodates the pooling of inventory items kept in the unattended facilities by more than one customer, thereby reducing total inventory costs. An inventory management service places an inventory of parts into the secure remote unattended inventory facility for later pickup by a technician for use at a customer's location. Parts may also be delivered directly to an unattended facility by a courier or shipping service. Such direct deliveries may occur on an "as-needed" or "just-in-time" manner. An inventory management service may be a vendor that performs its own inventory management and maintenance services or a third-party logistics entity such as, for example, UPS Supply Chain Solutions, to whom the vendor outsources all or part of its logistics needs. A technician may also be personnel from a third party, a vendor or a customer. Parts or items may also be directly placed in an unattended inventory facility by the inventory management service, a manufacturer, vendor, repair facility, courier, shipper, etc. or may be re-located from unattended facility to unattended facility. When a technician arrives at the secure remote unattended inventory facility, the technician preferably uses a keypad or some other data entry device to enter access information (e.g., the technician's ID, an order number, etc.) in order to gain access to the secure area where the parts are located or are to be returned. After the technician enters proper access information, the locker or room containing the customer's part is unlocked allowing the technician to retrieve a part. The same access control may be applied for inventory management service personnel to put parts into the locker or room for later retrieval by a technician.

In other embodiments of the invention, radio frequency identification ("RFID") tags may be used to capture item transactions (retrieval and/or restocking) automatically with an RFID reader. Items (e.g., parts) may be associated with an RFID tag. An RFID reader associated with the unattended facility may be used to record the retrieval and placement of items in the unattended facility. Further, RFID readers associated with the individual enclosures that comprise an unattended facility may automatically record the placement and removal of items in the enclosures. Likewise, a customer may be associated with an RFID tag. The RFID tag may be encoded with identification and authorization information. A customer may gain access to the unattended facility by having their RFID tag read. If the information encoded onto the RFID tag is authorized, then the customer will be provided with access to the unattended facility.

Unattended inventory facilities are generally commercially available products consisting of multiple enclosures with doors that have electronic locking mechanisms. In other embodiments, the unattended facilities may be rooms, cabinets or other areas where access is monitored or controlled. The inventory facilities are also comprised of one or more processors that control the electronic locking mechanisms, communications with a central server, and access programming, among other functions. Access to an enclosure is generally recorded either on memory at the unattended facility or such access information is transmitted to the central server via a network. Generally, the unattended inventory facility is programmed for a user's access by transmitting an access code from the central server or by prior recording of a PIN or some other form of a passcode to the unattended inventory facility's processor. A user will then use this access code (such as order number or some portion of it) and/or a PIN assigned to the user, to access the locker system and perform a parts transaction such as retrieving or stocking a part. Information about the user's access is transmitted to the central server and is available for an inventory management service whereby the inventory in the locker system is appropriately decremented/incremented. Re-stocking decisions can be made based upon the inventory levels in the unattended inventory facility. For example, if inventory levels are below an established minimum an order may be automatically generated to replenish the inventory level. Alternatively, the enclosures may be secured rooms or any sort of a secured enclosure that operate on the same premise as a locker. Further, the parts stored within the secure enclosures may have encoded identification tags (such as RFID tags) and monitoring devices such that the removal or placement of parts within the enclosures may be automatically recorded.

In some instances an unattended facility may be associated with a "touchdown station" where technicians or customers retrieving items may have a place to make phone calls, send and receive facsimile transmissions, access to the Internet, ship and receive parcels and mail, etc. Touchdown stations allow technicians to access a network such as, for example, the Internet to receive or download service orders and information that may be required to complete a service order, update the status of service orders and to complete service orders.

Consolidation

Consolidation may be utilized in some instances for inventory management purposes utilizing unattended facilities. Consolidation may increase the efficiency of the operation of an inventory management system as well as decrease transportation and shipping costs. Ordered items may be consolidated and shipped to the unattended facilities in consolidated packages. Courier runs to the unattended facilities may be consolidated and these couriers may carry consolidated packages.

In some instances the inventory management service may consolidate orders for items into fewer shipping containers than there are orders. An order is comprised of one or more items that have been requested by a specific customer. The orders for one or more customers are filled and packaged in fewer containers than there are orders. For instance, if there are N orders destined for a particular unattended facility, then the N orders will be consolidated and shipped in at most N−1, or fewer, containers. However, each order is individually packaged, controlled, tracked and received as an individual order. The individual orders are placed into the unattended facility for distribution to the customers.

Orders that are placed into a consolidated package are also referred to as sub-packages. Some form of human-readable or machine-readable indicia, or both, human-readable and machine-readable indicia uniquely identifies each sub-package in a consolidated shipping container. The unique sub-package identifier is linked with a tracking identifier that is associated with the consolidated shipping container in which the sub-packages are placed. This linking allows the sub-packages to be tracked as if shipped separately. A control device is associated with each consolidated shipping container. This control device associates each sub-package within the consolidated shipping container to the customer(s) that placed the order(s). This may occur in many ways including, for example, associating a sub-package's human-readable indicia with a customer's name, employee number, badge number, ID, etc. A control device may be as simple as a piece of paper indicating the association between the sub-packages and the customers, or it may be an electronic database, email, etc.

The sub-packages are placed in the secure enclosures of an unattended facility according to the customer. In some instances the consolidated packages may be placed in a secure holding area at the unattended facility by a shipping service and a courier dispatched to "load" the secure enclosures with the orders. The courier may be an inventory management service employee, a shipping service employee, or an agent of the inventory management service. In other instances the courier may carry the consolidated packages to the unattended facility. The control device facilitates placement of the sub-packages and identification of the associated customer. Access to the secure enclosures of an unattended facility is controlled such that only a customer that has been provided an access code may retrieve a sub-package from a secure enclosure.

In some prior art instances, couriers are dispatched to deliver items to technicians on an individual order to individual technician basis. Using unattended facilities, courier runs may also be consolidated thereby reducing the number of individual orders couriered to technicians. Couriers may be dispatched to transport or load orders into an unattended facility. Because more than one order for more than one customer may be transported or loaded, fewer courier runs are required. Couriers may be dispatched on a time basis (e.g., once every two hours), or they may be dispatched depending upon how many items are to be distributed from an unattended facility. Couriers may place orders from consolidated packages into the secure enclosures of an unattended facility for distribution, or they may be dispatched on such a basis that they are able to place multiple, individually-shipped orders into the secure enclosures. Couriers may also consolidate return parts into a consolidated return package and prepare them for shipment via a commercial shipping service or they may transport the return items to a centralized warehouse for further disposition by the inventory management service. The use of unattended facilities also allows the consolidation of courier runs as a courier may be dispatched to pick up multiple return items at a single unattended facility thereby avoiding the need to make multiple courier runs for each individual return part.

Direct Delivery Items

In some instances, items ordered by a customer are not kept in inventory by the inventory management service. These items may be needed on an expedited basis such that it is not practicable for the inventory management service to order the part from a third-party, receive it, and then place it in the inventory of an unattended facility. In these instances, the inventory management service may place an order for the items with a third-party vendor and have them delivered directly to the unattended facility through the use of a shipping service or courier without first being entered into the customer's inventory account with the inventory management service. In other instances, "cross-docking" techniques may be utilized where the ordered items are received at an inventory management service's facility and are immediately distributed to one or more unattended facilities using a shipping service, couriers or the inventory management service's own personnel. In yet other instances, the customer may call the third-party vendor directly and have the items delivered directly to an unattended facility.

In each of the above instances, inventory information about the directly-delivered items ("inbound information") is entered into a data entry device associated with the unattended facility, or an interface to an inventory management system located near the unattended facility. This information is provided to the inventory management service and may be available to the customer. The information is used for inventory management and logistics purposes as well as billing and accounting functions.

Group and Unassigned Order Distribution

Whether items are directly delivered to an unattended facility or have been delivered to the unattended facility by the inventory management service, the technician retrieving an order from the unattended facility may be able to retrieve group orders or unassigned orders. The technician may have been assigned to one or more groups by the technician's employer (i.e., customer) and upon accessing the unattended facility, will be able to view and retrieve other orders belonging to the groups' members, unless such order has a restriction placed on it ability to be reassigned. Unassigned orders are those orders that have been placed by a customer but have not been assigned to a specific technician. The customer may designate one or more technicians to be able to see and retrieve unassigned orders from an unattended facility when such technicians access the unattended facility.

The ability of the technician to view and select group or unassigned orders facilitates the efficiency and flexibility of the unattended facilities system in that a service call may be transferred to a technician with special skills and the technician to whom the service call has been transferred will be able to retrieve the part that is assigned to the technician from whom the service call was transferred ("transferor technician") without the need for the transferor technician to be present. The use of group and unassigned order also allows another technician to quickly take the place of an absent technician without having to rearrange the planned work schedule of the absent technician. Further, such a system allows "last minute" job reassignments and facilitates optimizing the dispatch of service technicians.

Combined Notification for Order Spanning Multiple Enclosures

Another aspect of the invention relates to notification of an intended recipient of an item placed in an unattended inventory facility. In some situations, for example, a technician may place an order with an inventory management service for items that are not kept in inventory in an unattended inventory facility. The inventory management service will deliver the order to the unattended inventory facility that is convenient to the technician. This order may consist of more than one item. The size and quantity of the items may require that they be placed in more than one locker or enclosure. Prior art unattended inventory or distribution systems generally created a separate notification for each item placed in a separate enclosure. This resulted in the technician receiving multiple notifications for a single order when the order consisted of multiple items placed in a plurality of enclosures. This could be confusing and irritating to the technician.

The present invention reduces such duplicity of notifications by sending only a notification that relates to all the items of an order to the ordering technician, preferably a single notification, even if the order consists of multiple parts and such parts are placed in more than one enclosure. Such notification may be, for example, in the form of an email, a page to a paging device, a telephone call, a radio frequency signal, a facsimile, etc. The order notification may be transmitted to more than one person and it may be repeated until the order is retrieved from the unattended facility.

Return Parts

Yet another aspect of the invention involves the return of parts to an unattended drop off facility. Such parts may have been unused surplus taken out of inventory by a technician, damaged parts that are being returned for repair or disposal, used parts that are still operable, parts returned under a warranty, etc. The technician returns the part to an unattended drop off facility. A technician gains access to the unattended drop of facility by entering identification and/or authorization information into a data entry device at the unattended drop off facility. Information about the part and the reason for its return is then entered into the data entry device located adjacent to the unattended drop off facility. An identification device such as, for example, a barcoded label or RFID tag, etc. may be attached to the return part and such device may be encoded with information indicating whether the part is "good" or "bad" and other information about the part. The identification device may be encoded with the data entered into the data entry device. For example, a printer may be located at the unattended drop off facility and upon entering information about the part to be returned into the data entry device, the user may be queried as to whether they wish to generate a barcoded return label. If the user answers affirmatively to the query, a return label is generated and printed by the printer and the label is associated with the return part by the user. Likewise, an RFID tag may be associated with the return part. In another aspect, a conventional encoder may encode an RFID tag with information entered into the data processing device and then associated with the return part.

The return part is then deposited into a secure locker, bin or other enclosure that is associated with the unattended drop off facility. Information entered by the user into the data entry device at the unattended drop off facility location is transferred by one or more processors associated with the unattended drop off facility via a network to a central server. Such information may avoid the user from having to await a return authorization from the inventory management service or a manufacturer. The entered information is also transmitted to the inventory management service long before the return part is moved and allows pre-processing of the return part to begin which accelerates the processing of the return part.

In some instances, when a new or replacement part or item is furnished to a customer, there is an expectation that an old part will be returned or that the new part may be returned if it is not used. In these instances, an account is created in the name of the technician who obtained the new part. The account indicates that either an old part or the new part is to be returned to the inventory management service. This account may be referred to as a "loan file."

When a return part is expected, certain information about the new part and the expected return part may be retained on the central server. When returning a part to an unattended facility, the person returning the part may enter some identifying information that will access the information about the expected return part on the central server and result in less information having to be entered by the person returning the part into the data entry device. In some instances, a new part or item may have been provided with a return shipping label such as, for example, an intelligent authorization for return shipping ("intelligent ARS") label such as that described in U.S. patent application Ser. No. 10/177,508, United States Patent Publication Number 20030195778, "Intelligent Authorized Return Systems and Methods," filed Jun. 20, 2002 and published on Oct. 16, 2003, naming Smith as inventor, commonly assigned to the owner of this invention, which is fully incorporated by reference herein and made a part hereof. The Intelligent ARS label is provided by the inventory management service for returning a used, old, replaced, unused or swapped-out part. Information about the new part and the return part may reside on the central server and be associated with the Intelligent ARS label. Therefore, when returning a return part to an unattended facility, some of the return information may not have to be entered by the technician/person returning the part because it already exists on the central server, further expediting the return process and reducing the possibility of data entry errors. In other instances, the technician may only have to enter an order number, part number, employee ID, or some other identifying information in order to access information about the new part and the expected return part.

Inventory management decisions may also be made from the return parts information. In one embodiment, the remote unattended drop off facility may be associated with a remote unattended inventory facility. For instance, the unattended drop off facility may be co-located with an unattended inventory facility or the unattended drop off facility may be incorporated into the unattended inventory facility. In this embodiment, for example, the central server will check the inventory quantities at the unattended inventory facility of the particular part that is being returned. If the inventory quantities are below a designated level and the return part is identified as "good," the return part may be placed in the inventory of the associated unattended inventory facility. This may be accomplished by the technician placing the "good" part in a certain bin and quantity of the inventory of that part at that unattended inventory facility incremented. Or, inventory management personnel may transfer the "good" part from a bin associated with the unattended drop off facility to a locker associated with the unattended inventory facility and increment the inventory quantity of the unattended inventory facility. If the inventory quantities at the remote unattended inventory facility are in excess of a designated maximum, inventory management personnel or a courier may return the part to a centralized warehouse or any other attended facility, or the part may be placed in the inventory of another unattended inventory facility. The present invention is capable of monitoring the inventory quantities of attended and unattended facilities and distribute "good" return items to facilities where they are most needed. Furthermore, this may result in cost savings over the traditional method of transporting all return parts to a central warehouse and then distributing them to where they are needed.

In other embodiments, parts that are intended for return from an unattended drop-off facility may be consolidated with other return parts into a consolidated return package and more economically shipped to a field stocking location, a distribution center or another location. As previously described, return items may be associated with an intelligent authorization for return shipping Intelligent ARS label. Intelligent ARS labels may be provided, for example, with parts supplied under a warranty replacement program such that the when the old part is replaced with the new part, the old part may be consolidated with other return parts and shipped via a consolidated shipping container with an attached Intelligent ARS label to a location determined by the label, or the parts may be individually packaged, labeled and shipped to the location determined by the Intelligent ARS label. Consolidated shipment of return parts may occur by the parts being consolidated into shipping containers by the customer, by a courier at the unattended facility, by inventory management personnel, or by shipping service personnel. Such consolidated return packages may be directly retrieved from an unattended facility by a shipping service or they may be transported and delivered to a shipping service by a courier or by inventory management personnel.

Conclusion

The present invention makes parts that are required for service more readily available. Further, cost savings may be realized through inventory consolidation, courier run consolidation, consolidated shipping, reduced labor costs, increased technician efficiency, and faster return processing. The system is more flexible than traditional warehouse inventory management as the remote unattended inventory facilities and unattended drop off facilities may be strategically located near customers without the expense of a traditional warehouse and may be relatively quickly and inexpensively relocated. Advantageously, inventory items may be pooled among a plurality of customers. For example, an unattended inventory facility may be strategically located near two customers. Each of these two customers may have an occasional, infrequent need for a high-cost part. Inventory costs may be reduced by the two customers (or one service provider that serves both customers) reaching an agreement to keep one of the high-cost, low-demand parts in the secure unattended facility rather than each customer keeping a separate one of the high-cost parts on-hand.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2A is a pictorial view of an exemplary unattended facility with lockers in an embodiment of the invention;

FIG. 2B is a pictorial view of a locker in an exemplary unattended facility in an embodiment of the invention;

FIG. 2C is a side view of the pictorial view of an exemplary unattended facility with lockers of FIG. 2A with portions broken away to show interior detail in an embodiment of the invention;

DETAILED DESCRIPTION OF THE INVENTION

Figure 1A:
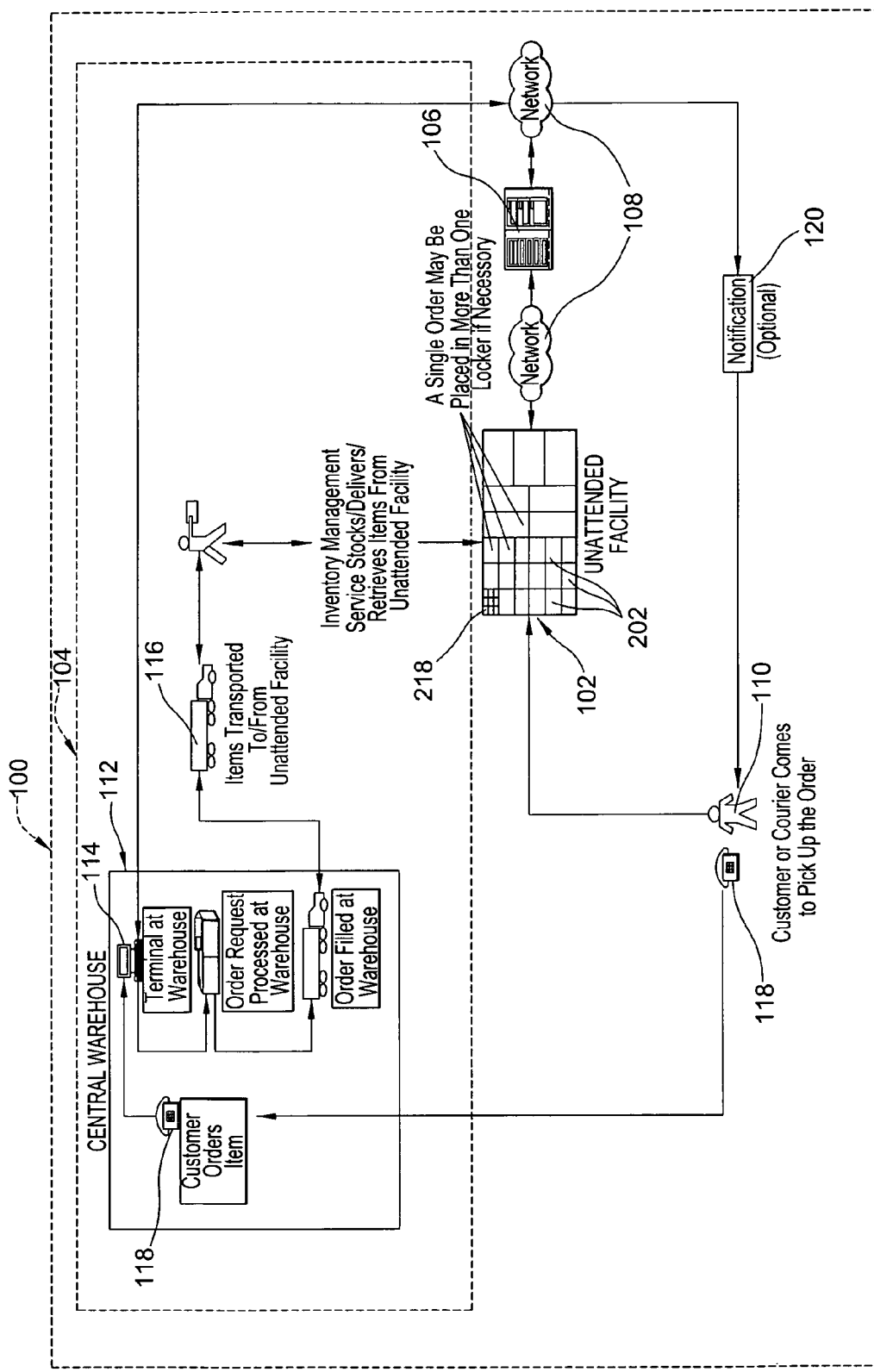
FIG. 1A is a diagrammatic representation of an exemplary system for inventory management utilizing an unattended facility with lockers in an embodiment of the invention.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Inventory management utilizing unattended facilities generally encompasses several broad concepts. In accordance with one concept an inventory of parts is continuously maintained in an unattended inventory facility by an inventory management service. The unattended inventory facility may be comprised, for example, of one or more secure enclosures, which may be lockers, rooms, enclosures or secure areas with locking mechanisms to such secure enclosures controlled by one or more processors. The unattended inventory facility may be located at or near one or more customers' facilities. The unattended inventory facility may be placed in a building, room or secure area where access to the device is controlled to enhance the security of the device. Depending upon customers' needs, various parts are maintained in certain quantities within the secure enclosures of the unattended facilities. Parts are retrieved from the on-hand inventory contained within the unattended inventory facility as needed. One or more forms of identifying information such as a passcode, PIN, order number, etc. may be required to be entered into one or more data entry devices associated with the unattended inventory facility in order to gain access to one or more secure enclosures. Such information may also be required to gain access to the area where the unattended inventory facility is located. If the level of inventory decreases below a predetermined minimum quantity in an unattended inventory facility, the inventory management service will re-stock the inventory to the appropriate level. The unattended inventory facility may be connected to a network and provide information to a central server such that access and inventory levels of the unattended facility may be remotely monitored. One or more encryption algorithms for security purposes may encrypt information transferred along the network. The central server may automatically generate a re-stocking order from the monitored information. The re-stocking order may be based upon factors such as a predetermined economic order quantity.

Another broad concept is where a part is needed that is not maintained in the inventory of the unattended inventory facility. In this instance, an order may be placed for the desired part with delivery to the secure unattended inventory facility. The delivery may be made by an inventory management service, courier, vendor or a shipping service. The order will then be retrieved from the unattended inventory facility at the convenience of the one who placed the order. In some instances, a person accessing an unattended facility may be able to view and retrieve group orders or unassigned orders. An order may consist of more than one part. In some instances, the complete order may not be able to be placed in a single secure enclosure because of the size and/or number of parts associated with the order. In other words, the order may "span" more than one locker or secure area. A notification is generally provided to the entity that placed the order when the order is delivered to the unattended inventory facility and is ready for pick up. Prior art systems generally provided a separate notification for each part that is placed in a separate secure enclosure. Therefore, a single order may result in multiple notifications if the order spans more than one secure enclosure. An embodiment of the present invention alleviates multiple notifications by providing one notification for the delivery of a single order, regardless of the number of secure enclosures in which the order is placed. Multiple orders destined for one particular unattended facility may be consolidated into fewer shipping containers than there are orders. This provides more economical transportation costs and reduces packaging materials.

A third broad concept of inventory management utilizing unattended facilities involves unattended drop off facilities. Unattended drop off facilities may be utilized for the return of unused, used or damaged parts. Such parts may be returned because they are not needed, for repair, for warranty purposes, etc. The return parts are first brought to the unattended drop off facility. An unattended drop off facility is similar to an unattended inventory facility in that it is generally comprised of one or more secure enclosures, which may be lockers, bins, rooms or secure areas, one or more processors that control access to the secure areas and communications with a server, a data entry device, and a connection to a central server via a network. The unattended drop off facility, similar to the unattended inventory facility, may also be in a building, room or secure area with monitored or controlled access. Access to a secure enclosure (and, if necessary, to the building, room or secure area) is then obtained by entering identification information such as one or more of a passcode, user ID, PIN, order number, etc. into one or more data entry devices associated with an unattended drop off facility. Additional information pertaining to the returned part may also be entered into a data entry device. Such information may relate to the reason for returning the part, whether the part is "good" or "bad", etc. As previously described, if the returned part is associated with a new part that has been supplied, a reference such as, for example, an Intelligent ARS label, an order number, etc. may link the return part to pre-existing information on the central server and may reduce the amount of information that has to be entered by the person returning the item.

A form of identification (a "return identifier"), may be associated with the return part. These return identifiers may be generated by a device at the unattended drop off facility such as, for example, a printer capable of printing barcoded labels or a device capable of programming a programmable RFID tag. The return identifiers may be pre-existing devices such as, for example, pre-printed barcode labels or "pre-programmed" RFID tags. The return identifier may be encoded with some or all of the information about the part that has been entered into the data entry device. The part along with its associated return identifier is then placed into the secure enclosure. Information entered into the data entry device may be used for to begin the processing of the returned part, including, for example, populating a database on the central server with information about the return part that may be utilized by the inventory management service. Such information may also preclude a user having to wait to receive an authorization for return material before returning a part. The part may then be retrieved from the unattended drop off facility by the inventory management service, a courier or a shipping service and brought to a central warehouse for further processing or the part may be returned to a manufacturer or otherwise disposed. This entered information may expedite the handling of the returned part. Furthermore, return items may also be consolidated into fewer shipping containers than there are return parts to achieve shipping economies. Return parts and return shipping containers may be associated with intelligent return shipping labels such as Intelligent ARS labels such that their return shipping and ultimate destination can be more efficiently undertaken.

Furthermore, inventory decisions may be facilitated from the information entered into the data entry device when returning a part to an unattended drop off facility. For example, if a returned part is "good" and is only being returned because it is not needed, the part may be brought back into a centralized warehouse by the inventory management service and then placed in inventory in an unattended inventory facility. In some instances, an unattended drop off facility may be co-located with an unattended inventory facility or the drop off facility may be incorporated into an unattended inventory facility. In such instances, the inventory levels of parts in the associated unattended inventory facility may be compared with a "good" return part that is placed in the unattended drop off facility. If the inventory level of that returned part in the associated unattended inventory facility is below a certain maximum level, then the part is transferred to the inventory of the unattended inventory facility at the convenience of the inventory management service. If the inventory level of that returned part in the associated unattended inventory facility is at or above a certain maximum level for that part, then the part is returned to a warehouse or transferred to another attended or unattended inventory facility at the convenience of the inventory management service.

The unattended inventory facilities or the unattended drop off facilities or the co-located (both unattended inventory facility and unattended drop off facility) may be placed at locations remote from one or more central warehouses but convenient to one or more customers. Conveniently locating these facilities reduces delay time caused by retrieval or return of parts. Furthermore, multiple customers may "pool" their inventory of high-cost, low demand items in an unattended inventory facility such that each customer's parts inventory cost is reduced while yet not significantly decreasing the likelihood of parts availability and not significantly increasing the time to retrieve a needed part.

These concepts and others are discussed in further detail below.

Referring now to FIG. 1A, an inventory management system utilizing unattended facilities (100) is generally comprised of one or more centralized warehouses (112) (the term "central warehouse" is used herein to denote one or more warehouses), one or more secure unattended facilities (102) comprised of at least a secure enclosure (202), a data entry device (218), a central server (106) that may be comprised of one or more servers that may or may not be located at the same location and a network (108); an inventory management service (104) comprised of at least a central warehouse (112), a communication device (118) capable of receiving an order from a customer (110), a transportation device (116) capable of transporting inventory items to and from an unattended facility (102), and an interface (114) with the central server (106) via the network (108).

Figure 1B:
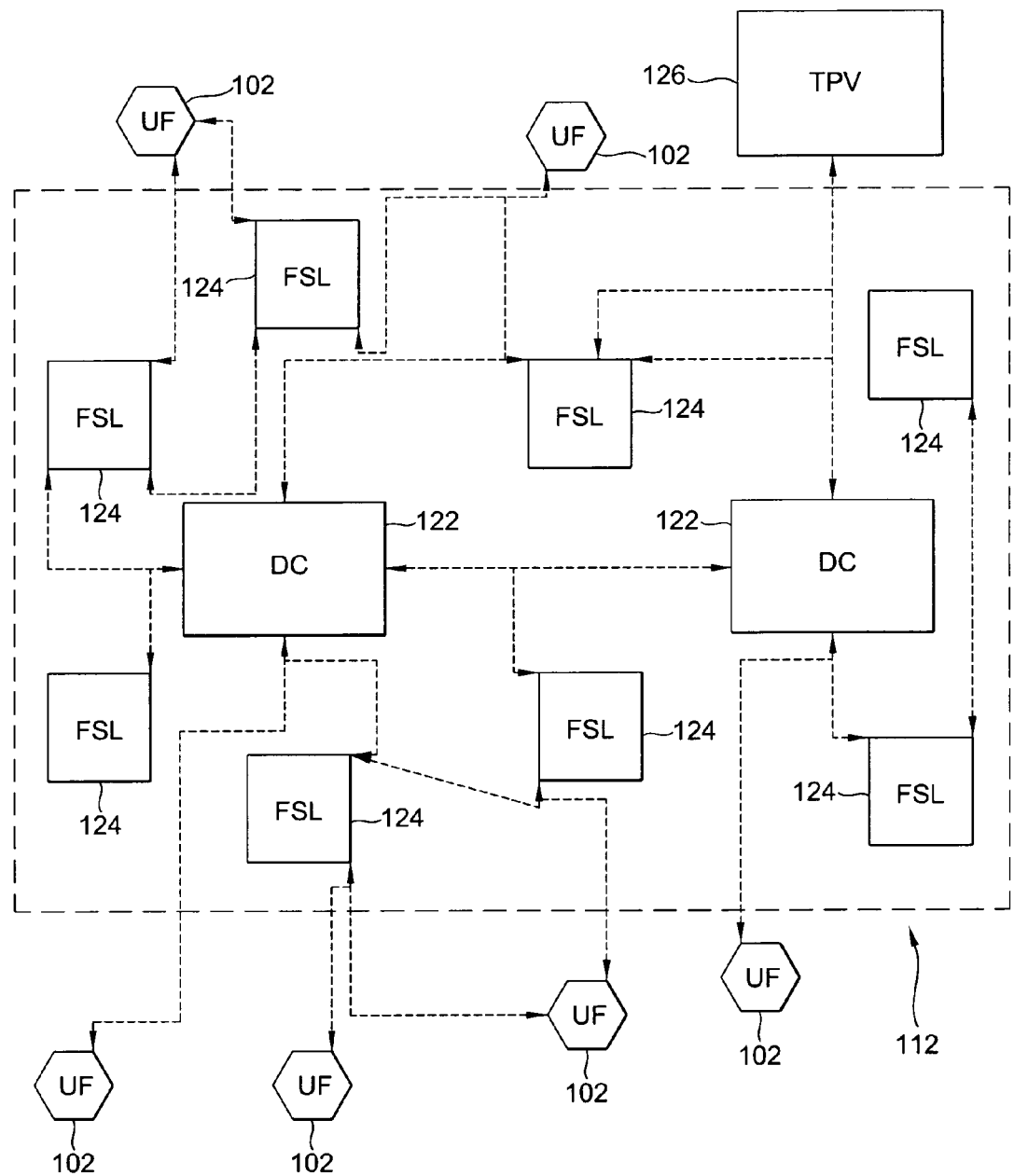
FIG. 1B is a diagrammatic representation of an exemplary system for an inventory management service's distribution network utilizing distribution centers, field stocking locations and unattended facilities in an embodiment of the invention.

As shown in the embodiment illustrated in FIG. 1B, a central warehouse (112) may be comprised of one or more of a distribution center ("DC") (122) or a field stocking location ("FSL") (124). A DC (122) is a larger site than a FSL (124) and is at a more centralized location to support (e.g., replenish) FSLs (124). Generally, there are fewer DCs (122) in a service distribution network than there are FSLs (124), thus they are not located in close proximity to most customers (110). A DC's (122) larger size generally allows the storage of more inventory items than what may be stored in a FSL (124). Inventory items from vendors, suppliers and manufacturers (126) are usually delivered to the DCs (122) and the inventory management service (104) uses items from the DCs (122) to maintain inventory in the FSLs (124). DCs (122) sometimes function as consolidation points for return items also.

FSLs (124) are smaller sites, strategically located closer to customers (110) to provide faster delivery response times. Customers (110) may pick-up items directly from a FSL (124). Although generally supplied by the DCs (122), FSLs' (124) inventory may be obtained directly from vendors, suppliers and manufacturers (126), or it may come from other FSLs (124).

The secure unattended facility (102) may be an unattended inventory facility or an unattended drop off facility or a facility that is both, an unattended inventory facility and an unattended drop off facility. The secure unattended facilities (102) are generally remote from a central warehouse (112). A customer (110) will either retrieve parts from the unattended facility (102) or will return parts to the unattended facility (102) for later pick up by the inventory management service (104), courier or a shipping company. The customer (110) may receive a notification (120) once an order placed by the customer (110) is ready for pick up. Such a notification (120) is generally an electronic transmission such as, for example, a page to a paging device, a telephone call, an email, a transmission to a personal digital assistant ("PDA"), or by some other form of notifying the customer (110). It may contain additional information such as, for example, a passcode that can be used to access the unattended facility (102).

The secure unattended facilities (102) are generally products that are commercially available from, for example, SALock, Inc./TEKWave, Inc. of Duluth, Ga., or SupplyPro, Inc. of San Diego, Calif., among others. The products may also be patented, reference U.S. Pat. No. 6,300,873 issued on Oct. 9, 2001 to Kucharczyk, et al.; U.S. Pat. No. 5,774,053 issued on Jun. 20, 1998 to Porter; and U.S. Pat. No. 5,979,750 issued on Nov. 9, 1999 to Kindell, each incorporated herein and made a part hereof. FIGS. 2A, 2B and 2C illustrate an embodiment of an exemplary unattended facility (200). FIG. 2A is a pictorial view of an exemplary unattended facility with lockers in an embodiment of the invention. FIG. 2B is a pictorial view of a locker in an exemplary unattended facility in an embodiment of the invention and FIG. 2C is a side view of the pictorial view of an exemplary unattended facility with lockers of FIG. 2A with portions broken away to show interior detail in an embodiment of the invention. The unattended facility is generally comprised of one or more secure enclosures such as lockers (202) of various sizes. Each locker (202) has a door (204) with a lock (206), sides (208), top (210), bottom (212) and a back (214). In another embodiment (not shown), the locker (202) may not have a back (214) to facilitate placing items in the locker (202) from a restricted area. In other embodiments (not shown), the locker (202) may have ventilation means such as holes or holes with forced ventilation such as, for example, a fan. In yet other embodiments, the lockers (202) may be heated or cooled depending upon the requirements of items that are placed within. One or more processors (216) located within the unattended facility (200) controls each lock (206). The processors (216) are programmed to unlock specific lockers (202) when certain identifying and authorizing information (i.e., a passcode such as, for example, a PIN, order number, name, badge number, etc.) is entered into or read by a data entry device (218). The data entry device (218) may be, for example, a keypad, a barcode scanner, an infrared scanner, an RFID reader, a voice recognition device, a touch screen, etc. Some embodiments of the unattended facility (200) will have a display device such as, for example, a display screen (220). In one embodiment, the processors (216) may be programmed locally through the data entry device (218) to allow access to one or more lockers (202) when the correct identifying information is entered. The unattended facility (200), referring to FIGS. 1 and 2, is connected to a central server (106) via a network (108). Information transmitted between the locker(s) and the central server and along the network may be encrypted for security purposes. Such encryption occurs through the use of commercially available encryption algorithms and commercially available decryption algorithms decipher the encrypted information. In other embodiments, the processors (216) may be programmed for access to lockers (202) by information sent from the central server (106) via the network (108). The processors (216) may be designed for one or two-way communications with the central server (106).

The inventory management service (104) such as, for example, UPS Supply Chain Solutions, is an organization that makes an inventory of parts available to a customer (110). Traditionally, such parts were kept in a warehouse controlled by the inventory management service (104) and were either delivered to the customer (110) by the inventory management service (104), a courier or a commercial shipper. Alternatively, the customer (110) may retrieve the parts from the warehouse. In an embodiment of the present invention, the inventory management service (104) or an authorized agent of the inventory management service provides several services, including controlling one or more centralized warehouses (112), maintaining an inventory of parts for one or more customers (110) in the unattended facilities (102), providing and delivering special order parts to unattended facilities (102) for later pick up by customers (110), monitoring access to and inventory levels of unattended facilities (102), programming the processors (216) of unattended facilities (102) for access by customers (110) and retrieving returned parts from an unattended drop off facility or placing such parts back into inventory. The inventory management service (104) may work concurrently with agents, commercial couriers and shippers or its customers for the placement of parts in an unattended facility, programming of the processors (216) and the retrieval of return parts or it may perform these functions through its own personnel and equipment.

The network (108) may be one or a combination of wireless, wired, fiber optic, or any other medium capable of transferring information. It may utilize one or more technologies such as the Internet, telephone, paging systems, email, etc. Data encryption/decryption technology may be employed throughout the network to provide enhanced information security.

The customer (110) is generally a service group that is known to the inventory management service (104) and that utilizes technicians to maintain certain equipment of one or more clients. As an illustrative example, the customer (110) may be a computer corporation ("Computer Corporation") and the customer's client a stock exchange (the "Stock Exchange"). The Stock Exchange will have contracted with Computer Corporation for the maintenance and repair of its computer systems. Parts needed for the maintenance and repair of such systems will be maintained by the inventory management service (104) in the inventory of an unattended inventory facility located at or near the Stock Exchange facility. In other instances, the customer (110) may perform maintenance and repair functions for more than one client and the unattended facility (102) will be located remote from the central warehouse (112) yet proximate to both clients. In the above example, for instance, Computer Corporation may also perform maintenance and repair for a brokerage firm ("Brokerage Firm") as well as the Stock Exchange. The unattended facility (102) may be located in close proximity to both the Stock Exchange and Brokerage Firm to decrease Computer Corporation's delay while retrieving or returning parts. Furthermore, Computer Corporation, or Computer Corporation in combination with the Stock Exchange and Brokerage Firm may decide to pool its inventory of high cost, low demand parts. For example, if both the Stock Exchange and Brokerage Firm have the same or similar systems that require an expensive part that fails infrequently (i.e., "Part X"), Computer Corporation may keep one Part X in the unattended facility (102) that is in close proximity to the Stock Exchange and Brokerage Firm rather than keeping two Part Xs. This ability to pool parts for multiple customers is a cost saving benefit of the present invention. In yet other instances, the customer (110) and the client are the same because the client will perform its own maintenance and repair of its systems generally using its own employees as technicians. Then, in these instances, the multiple customers (e.g., the Stock Exchange and Brokerage Firm) may reach an agreement to pool their inventory of high cost, low frequency parts in order to achieve savings in their parts inventory.

In one embodiment, the customer (110) may be an "account" (e.g., a service group). An account is a business or organization that is comprised of one or more persons. For instance, the account may be the Computer Corporation used in the above example and be comprised of one or more repair technicians and one or more office personnel. The technician, when needing a part, may call the Computer Corporation's office personnel to order the part. The office personnel may then transfer the order to the inventory management service (104) for fulfillment. If the technician's desired part is in the inventory of an unattended facility (102), the technician may be directed to such an unattended facility (102) and may be provided with a passcode, if not previously assigned, to enable the technician to gain access to the part. If the technician's desired part is not in the inventory of an unattended facility (102) and is needed in a timely fashion, then the inventory management service (104) will have the part retrieved from a central warehouse (112) and delivered to an unattended facility (102). If the desired part is not located in a centralized warehouse (112) then the inventory management service (104) or a representative of the account may order the part from a third-party vendor and have it delivered directly to the unattended facility (102).

The communications device (118) may be any device capable of receiving an order from a customer (110) such as, for example, a telephone, an email system, Internet access, a virtual private network, etc.

The transportation device (116) may be any device capable of transporting inventory items to and from an unattended facility (102) such as, for example, one or more of a vehicle including trucks, vans, trains, airplanes, etc.

The interface (114) with the central server (106) is generally a device connected to the network (108) and capable of receiving and sending information over the network (108) to and from the central server (106). In other embodiments, (reference FIG. 16), an interface (1616) may be located at a customer's (1620, 1622) facilities. Communications between the central server (106) and the unattended facility (102) or between the unattended facility (102) and the central server (106) may be one-way or two-way. Information sent to and from the central server (106) from either an interface (114, 1616) or an unattended facility (102) may be encrypted.

In instances where the customer has access to an interface (1616), and where multiple customers (1620, 1622) each have inventory in one or more shared unattended facilities (102, 1606), each customer (1620, 1622) will be provided access to only the information about that customer's inventory and transactions via the interface (1616). The inventory management service (104, 1618) will have access to all information about the unattended facility (102, 1606) and will be able to control access to that information.

Figure 3:
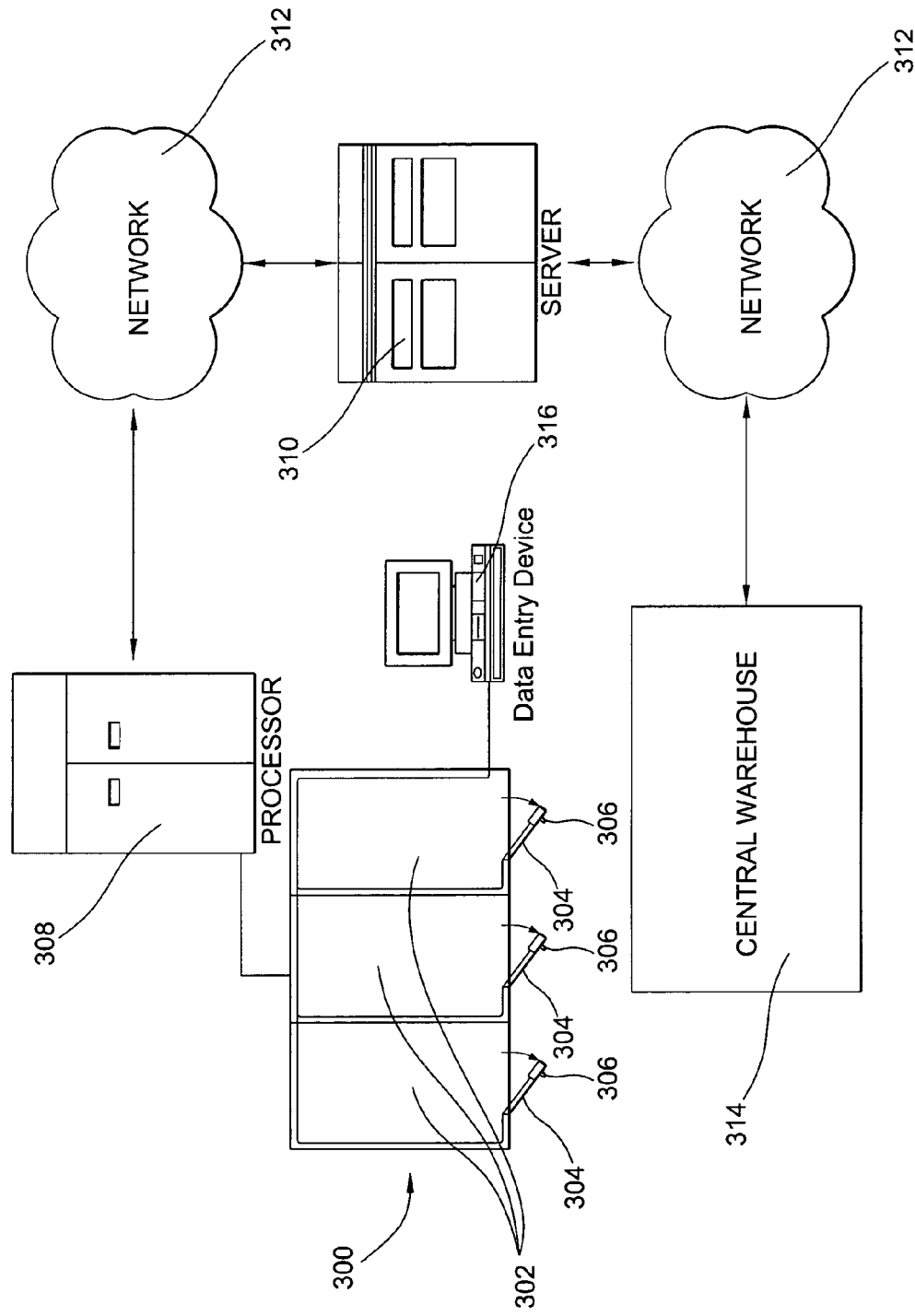
FIG. 3 is a diagrammatic representation of an exemplary system for inventory management utilizing an unattended facility with rooms in an embodiment of the invention.

Alternatively, in other embodiments as illustrated in FIG. 3, the unattended facility (300) may be comprised of one or more rooms (302), with each room having one or more doors (304) with each door having a lock (306). One or more processors (308) control each lock (306). Similar to FIG. 1, the processor or processors (308) are connected to a central server (310) via a network (312). One processor (308) may control all the locks (306) on the doors (304) via solenoids, actuators or other devices incorporated in the locks (306), or each door (304) may have a separate processor (308). Also, the processor or processors (308) will control communications with the central server (310). Local communication with the processors (308) may occur with a data entry device (316) at the unattended facility (300). The central server (310) provides and receives information and instructions from the inventory management service's central warehouse (314) via a network (312). Additional alternative embodiments may exist in the form of a multi-shelved cabinet with one locking door that provides access to all the shelves or secure areas maintained within a larger building or room such as, for example, areas bounded by fencing inside a warehouse. Each area bounded by a fence will have a door to provide access to the secure area with a lock on the door controlled by one or more processors. The processors will be connected to a central server (310) via a network (312).

Momentarily referencing FIG. 16 again, the larger building or room (1602) may have an electronic lock (1604) that is controlled by one or more processors. These may be the same processors (308) that are used to control the unattended facility (300, 1606), or they may be separate processors that are associated with and connected to the unattended facility processors (308). A person will enter an access code, passcode or have information scanned or read such as, for example, magnetic or radio frequency media, into a data entry device (1608) in order to gain access to a larger building, room or secure area (1602) containing the unattended facility (1606). Such access may be monitored by the processors (308) of the unattended facility (1606) and transmitted to the central server (310, 1610) via a network (312, 1612). Also, in some embodiments, the larger building, room or secure area (1602) may have one or more video cameras (1614) so that the inventory management service or the customer may visually monitor the area and any transactions occurring at the unattended facility (1606).

In one embodiment of the invention where the unattended facility (1606) may be a part of or located within a larger building, room or secure area (1602) having one or more video cameras (1614), the video cameras (1614) may be web-based cameras ("web-cams"), that transmit their video data via an Internet connection. Furthermore, the web-cams (1614) may not constantly stream data and may only be actuated by activity around or concerning the unattended facility (1606). For instance, the web-cams (1614) may only be actuated by someone entering their PIN, passcode, etc. into the data entry device (218) of the unattended facility (1606). The web-cam (1614) may transmit data video data via a network (1612), such as, for example, the Internet, or to the central server (310, 1610) while the transaction is occurring. The video data may be associated with time-stamped information about the transaction that is stored on a database residing on the central server (310, 1610). In this manner, the video data may be searchable and may be made available to interfaces (1616) to the central server (310, 1610) that have been granted proper authorization.

Figure 4:
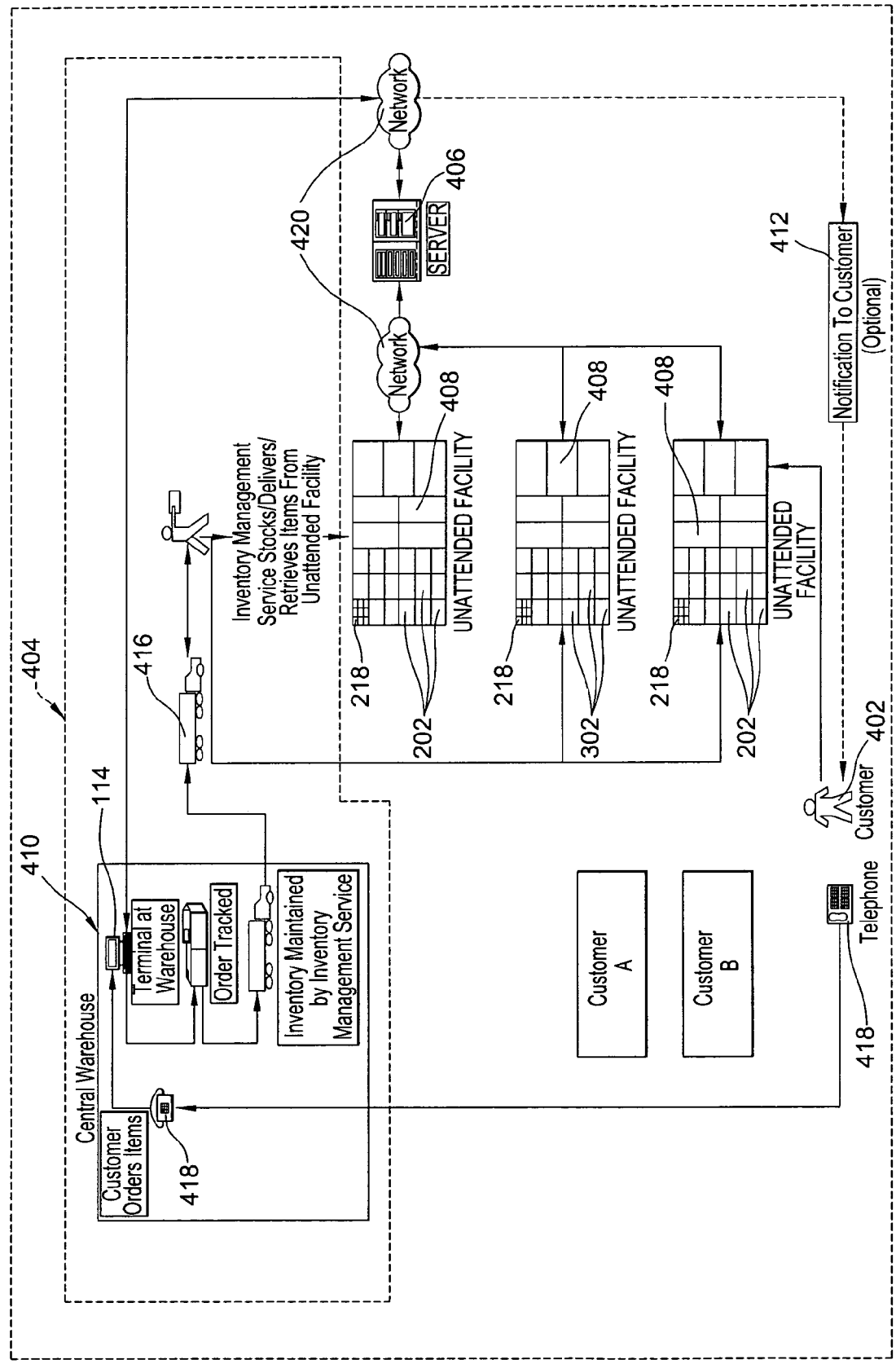
FIG. 4 is a diagrammatic representation of an exemplary system for providing a customer a requested item from the inventory of an unattended facility in an embodiment of the invention.

In one embodiment of the present invention, (referring primarily to FIG. 4 but also to FIGS. 2 and 3), a customer (402) places an order for one or more parts with an inventory management service (404). An order is placed by the customer (402) contacting the inventory management service (404) through a communications device (418) such as, for example, a telephone. A customer (402) placing an order may involve the person (i.e., a technician) actually requesting the item contacting someone in that person's office to request the item. This request is then forwarded to the inventory management service (404) by, for example, calling, faxing, mailing or emailing the inventory management service (404), utilizing electronic data interchange, or otherwise making the inventory management service (404) aware of the desired item. The customer (402) is generally known to the inventory management service (404) through prior dealings or a contractual relationship. The central server (406) will have residing upon it information about the parts that are in the inventory of the unattended inventory facilities (408) that are associated with that server (406). The inventory management service (404) will check its inventory of parts in unattended inventory facilities (406) that are in close proximity to the customer's location.

If the parts requested by the customer (402) are found to be in one or more unattended inventory facilities (408) that are in close proximity to the customer (402), the customer (402) will be provided with a notification (412) that includes the location of the unattended inventory facilities (408) and, in some instances, an order number or a passcode. A technician or a courier under the direction of the customer (402), will then go to the unattended inventory facilities (406) as indicated by the inventory management service (404). The technician or courier (402), will then enter one or more passcodes into a data entry device (218) at each unattended inventory facility (406). These passcodes may be associated with identifying and authorization information such as, for example, one or more of an order number or some part or combination of an order number, a user ID, a PIN, a badge number, a name, etc. The data entry device (218) may be, for example, one or more of a keypad, a barcode scanner, an infrared scanner, an RFID reader, a voice recognition device, magnetic media reader, etc. The processors (216) are preprogrammed to recognize certain passcodes. This preprogramming may have occurred by programming that occurred at the unattended inventory facility (408) location by authorized personnel, or the programming may occur by the transfer of information from the central server (406) to the processors (216) of the unattended inventory facility (408).

The passcode entered into the data entry device (218) of the unattended inventory facility (408), if recognized by the processors (216) of the unattended inventory facility (408), or by the central server (406), will allow the customer (402) access to the secure enclosures (202, 302) where the requested parts are located. Access will be gained either by the processors (216) automatically unlocking the doors (204) associated with the customer's (402) order or a display (220) will indicate to the customer (402) the available parts and the secure enclosures (202, 302) in which these parts are located. The customer (402) may then select the desired secure enclosures (202, 302) that will then have the locks (206) of their doors (204) opened by the processors (216). The accessed secure enclosures (202, 302) will contain one or more parts that are being held in inventory. Generally, the parts in any individual locker, room or secure area (202, 302) are of the same type. The processors (216) will monitor customers' (402) access to the secure enclosure (202, 302) and such access will be recorded by the central server (406). This access information along with the information known about the order (e.g., the type of parts desired and the quantity of each type desired) will allow the central server (406) to track the inventory quantities of parts in the unattended inventory facilities (408). Inventory replenishment decisions for the unattended inventory facilities (408) may be made from this inventory tracking information. Inventory tracking information may also be used for billing and reporting purposes by the inventory management service and the customer or account. Such reports may be generated automatically or on an as-needed basis. They may be displayed and printed at the inventory management service's and the customer's interfaces (114, 1616) with the central server (406, 1610). Customers (402) may be billed for any parts that they remove from the secure enclosures (202, 302). In another embodiment, the customer (402) owns the parts stocked within the unattended inventory facility (408) and pays service fees to the inventory management service (404).

Figure 5:
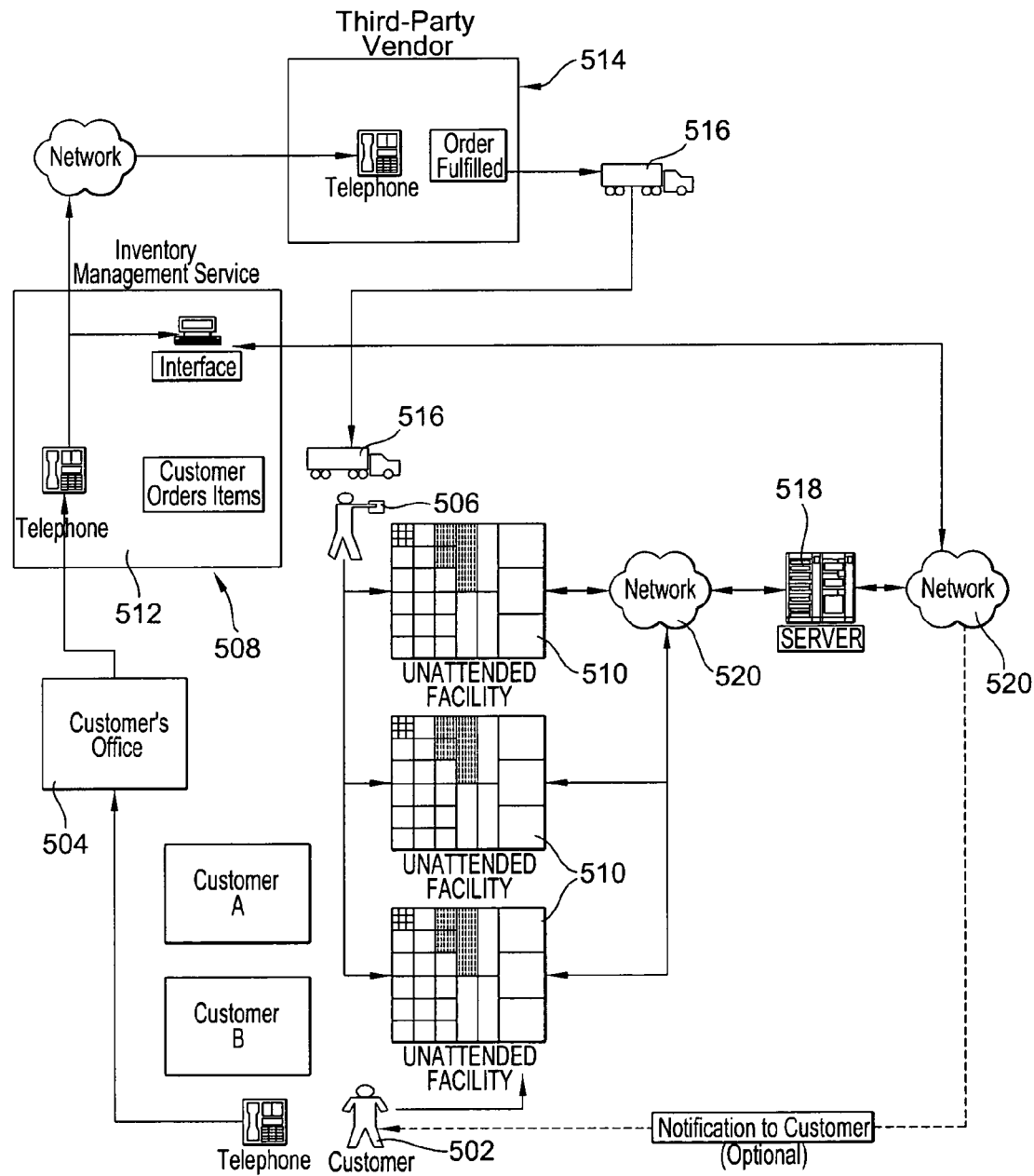
FIG. 5 is a diagrammatic representation of an exemplary system for inventory management utilizing an unattended facility with lockers where the inventory management service forwards the customer's order to a third-party vendor for fulfillment in an embodiment of the invention.

In some instances, the parts requested by a customer (402) may not be kept in the inventory of unattended inventory facilities (408) located in close proximity to the customer (402). In those instances, the inventory management service (404) may remove the desired part(s) from the inventory of a central warehouse (410) or obtain them in some other manner, transport them to the unattended facility (408) and deliver them to an unattended inventory facility (408) for later pick up by a customer (402). Such delivery may be made by personnel from the inventory management service (404) using a transportation device (416) or a courier or commercial shipper under the direction of the inventory management service (404). As shown in FIG. 5, a person (502) desiring an item (506) may contact someone at that person's office (504) to request an item (506). In one embodiment, the request will then be sent to the inventory management service (508). The inventory management service (508) will determine whether the requested item (506) is in the inventory of an unattended inventory facility (510) or a central warehouse (512). If not, and if the item (506) is needed on an expedited basis by the customer (502), the inventory management service (508) may place an order for the item (506) with a third-party vendor (514) such as, for example, a wholesaler, manufacturer, etc. The third-party vendor (514) will fulfill the order. In one embodiment, the ordered item (506) will be transported directly to an unattended inventory facility (510) by a commercial shipping service (516), the inventory management service (508), a courier, or the third-party vendor (514). In another embodiment (not shown), the ordered item (506) may be shipped to a central warehouse (512) of the inventory management service (508) from the third-party vendor (514) and immediately taken from the central warehouse (514) to an unattended inventory facility (510) before it can be processed into the inventory of the central warehouse (i.e., a "cross-docking" event). The item (506) will be transported from the central warehouse (512) to an unattended inventory facility (510) by the inventory management service (508), a courier or a commercial shipper.

The person delivering an item (506) to an unattended inventory facility (510), whether that person is an employee, agent or representative of the inventory management service (508), courier, or commercial shipper (516) (a "delivery person"), will gain access to the unattended inventory facility (510) in a similar manner as when a customer (502) retrieves parts from an unattended inventory facility (510). Namely, the inventory management service (508) will enter authorization and identification information into a data entry device (218) at the unattended inventory facility (510) that will enable the delivery service (516) access to certain secure enclosures (202, 302) to place the delivered items (506) or such information will be transmitted to the unattended facility (510) from the central server (518). Furthermore, if the ordered item (506) is one that has not been entered into the inventory records of the inventory management service (508), the delivery person may enter information into the data entry device (218) (whether by keypad, scanning, photographic, radio frequency, optical, magnetic, etc.) such that the information may be transmitted to the central server (518). Here, such information may be entered into the inventory management service's (508) inventory system for accounting, billing, product management and other purposes and it also may be transmitted via a network (520) to the customer's (502) inventory management system. In other embodiments (not shown FIG. 5, reference FIG. 16), the information may not be entered into the data entry device (218); rather a separate terminal or processor (1624) may exist at the unattended facility (1606) to obtain information about items that have not been entered into the inventory management service's (1618) inventory. This separate terminal or processor (1624) may be connected via a network (1612) to the central server (1610), or it may be connected to a separate inventory management system (not shown). In each embodiment, however, the point at which information about these items that are delivered directly to an unattended inventory facility (1606) is entered into the inventory management system is at the unattended inventory facility (1606). An encryption algorithm may encrypt information before it is transmitted over a network (1612).

In other embodiments (not shown), the delivery person may not place the delivered items (506) into separate secure areas to be later retrieved by the intended recipient (502), but will place all the delivered items (506) (i.e., orders) into one secure area. The delivery person (516) will gain access to this secure area as described above, place the orders into the secure area, closing and locking the door to the secure area. Inventory management service personnel, or an agent of the inventory management service, will gain access to the secure area in which the items have been stored and place the orders in separate secure enclosures (e.g., lockers or rooms) depending upon the customer that placed the order, the size of the item(s), etc.

In some instances, if the order consists of more than one part, all the parts may not be able to be placed into a single secure enclosure (202, 302). In such instances, the parts that comprise the order may be placed into separate secure enclosures (202, 302).

The customer (402, 502) may receive a notification (412) that the ordered parts (506) have been delivered to the unattended inventory facility (300, 510) and are ready for pick up. Generally, this notification (412) may be in the form of an electronic page, an email, a telephone call, a facsimile, or by any other form of notifying the customer (402, 502) that the order has been delivered. In one embodiment of the present invention, the customer (402, 502) receives only a single notification (412) when an order is delivered to an unattended inventory facility (300, 510), even if the order is placed in more than one locker, rooms or secure areas (202, 302). This is an improvement over prior art systems that provide a separate notification (412) for each part that placed in a separate secure enclosure (202, 302). In some embodiments, although only a single notification (412) is provided for orders placed in more than one secure area (202, 302), this notification (412) may be sent to more than one customer (402, 502), or the notification (412) may be resent if the order has not been retrieved within a predetermined time period. After the ordered parts have been placed in the unattended inventory facility (300, 510), the customer (402, 502) will access the secure enclosures (202, 302) and retrieve the parts by entering a passcode in a data entry device (420) and gaining access to the secure enclosures (202, 302).

Figure 6:
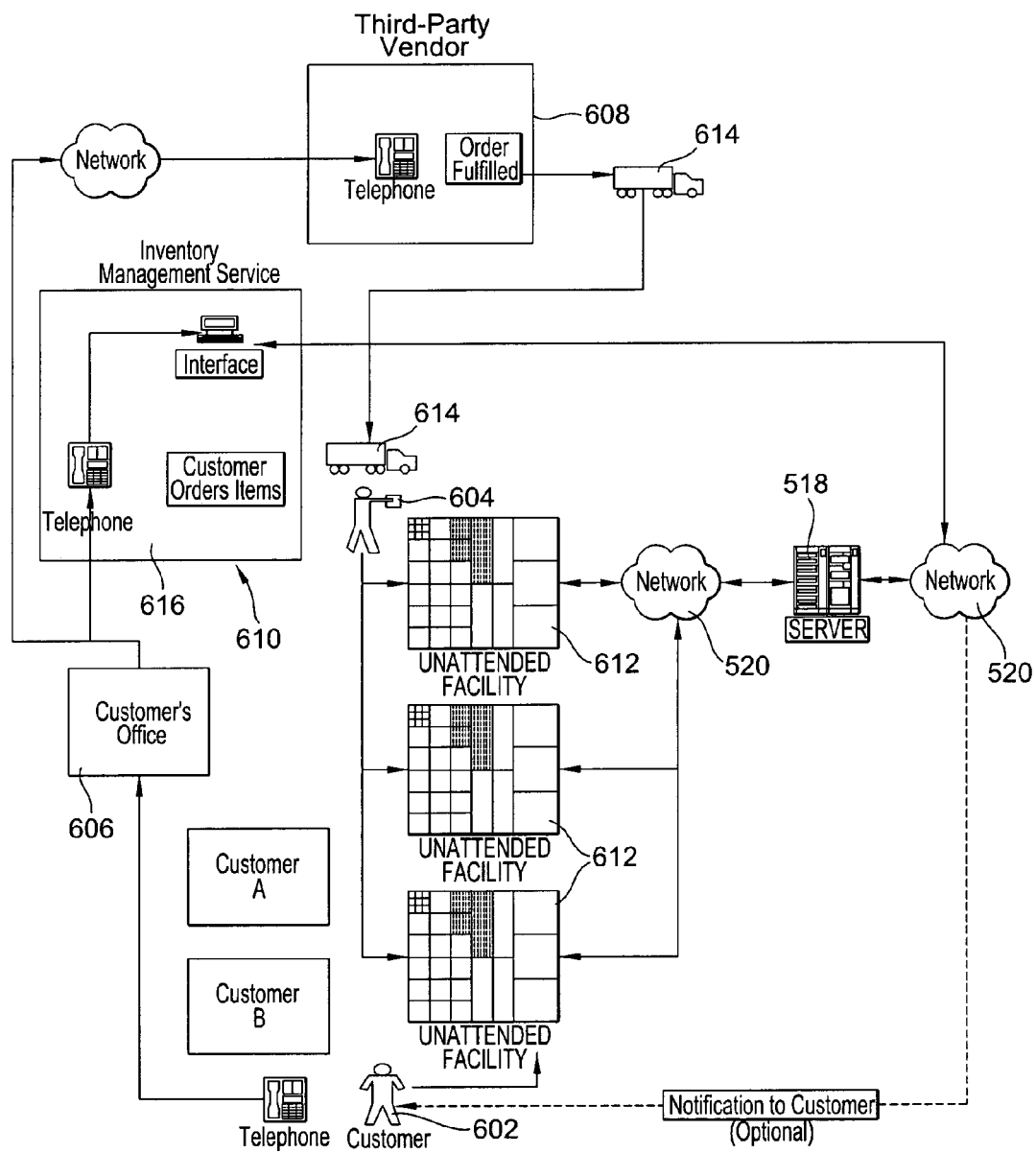
FIG. 6 is a diagrammatic representation of an exemplary system for inventory management utilizing an unattended facility with lockers where the customer's order is placed directly with a third-party vendor for fulfillment in an embodiment of the invention.

Another embodiment of the above-described system and process is shown in FIG. 6. A customer (602) such as a technician desiring an item (604) may contact someone at that person's office (606) to request the item. In this embodiment, the request will then be sent directly from the customer (602) to a third-party vendor (608). The customer (602) may also notify the inventory management service (610) that they have placed an order directly with a third-party vendor (608) and provide order information. This notification to the inventory management service (610) may be electronically transmitted such as, for example, through an electronic data interchange ("EDI"). This notification will allow the items to be tracked by the inventory management service once the third-party vendor (608) has shipped them. The third-party vendor (608) will fulfill the order. In one embodiment, the ordered item (604) will be transported directly to an unattended inventory facility (612) by a commercial shipping service (614), the inventory management service (610), a courier, the third-party vendor (608), etc. In another embodiment, the ordered item (604) may be shipped to the central warehouse (616) of the inventory management service (610) and cross-docked (as previously described). The item (604) will then be transported from the central warehouse (616) to an unattended inventory facility (612) by the inventory management service (610), a courier or a commercial shipper (614).

Items shipped to an unattended inventory facility (612) from a third-party vendor (608) or a centralized warehouse (616) may be shipped as a consolidated shipment as described below. Now referencing FIG. 7, items (702) ordered by a particular customer (704) (an order) are packaged into individual containers (706), such as, for example, plastic bags (i.e., "sub-packages"). Each sub-package (706) is associated with identifying indicia (708) that may be machine-readable, human-readable, or both machine-readable and human-readable. Depending upon the size and number of the items (702) ordered, several orders (706)

(comprised of one or more items) that are intended for the same unattended inventory facility (710) may be consolidated into one shipping container (712), or fewer shipping containers (712) than there are orders (706). For example, if N orders are destined for a particular unattended inventory facility (710), then the orders (706) will be individually packaged and shipped in N−1 shipping containers (712), or fewer, to the unattended inventory facility (710). A control device (714) either associated with or included within a consolidated shipping package (712) identifies the intended recipient of each individual order (706). Finally, the consolidated shipping container (712) includes a shipping identifier (716) that may be human-readable, machine-readable or both human-readable and machine-readable. The shipping container identifier (716) is linked with the identifying indicia (708) of each sub-package (706) contained within that shipping container (712) so that each sub-package (706) may be individually tracked during shipment.

Consolidated shipping reduces transportation, labor and packing material costs. Furthermore, courier functions are consolidated by the use of unattended facilities. Individual courier runs to individual customers are reduced because items ordered by more than one customer are delivered to and made available at an unattended facility thereby reducing the number of transactions required to deliver items to customers.

Figure 8:
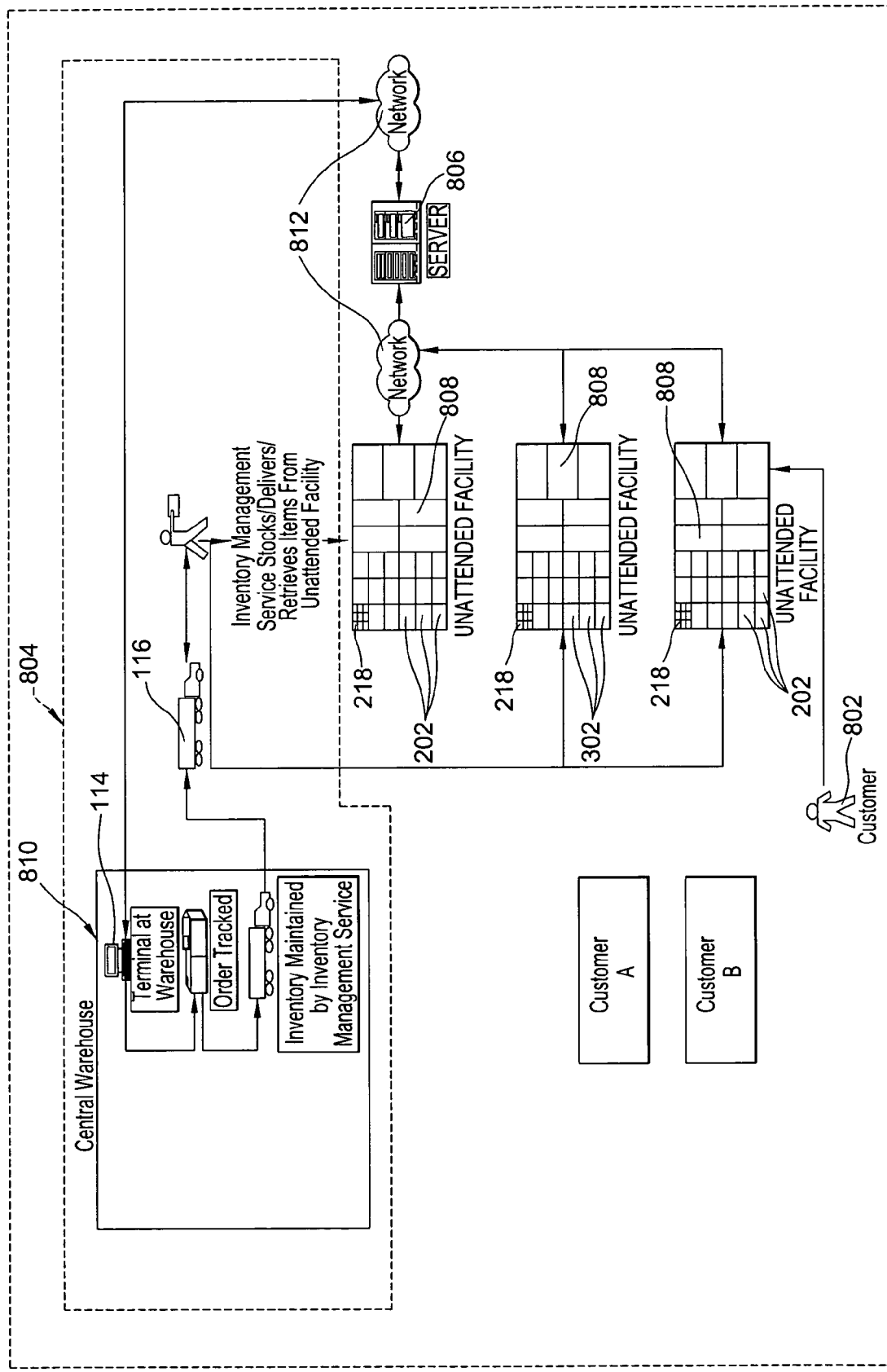
FIG. 8 is a diagrammatic representation of an exemplary system for providing a customer with an item from the inventory of an unattended facility in an embodiment of the invention.

Another embodiment of the present invention is a system where the customer (402) does not place an order with the inventory management service (404) before going to an unattended inventory facility (408) to retrieve parts. FIG. 8 illustrates a system where the customer (802) has been previously assigned a passcode that allows the customer (802) access to the unattended inventory facility (808). The customer (802) has prior knowledge of the location of the unattended inventory facility (808) and the parts contained therein. As described above, access to the unattended inventory facility (808) is gained by entering the pre-assigned passcode into a data entry device (218) at the unattended inventory facility (808). The customer (802) will be provided information about the contents of the secure enclosures (202, 302) by means such as, for example, a display screen (220), a plaque, notes, signs, etc. located at the unattended inventory facility (808).

After gaining access to the unattended inventory system (808) by use of the pre-assigned passcode, the customer (802) will then select the secure enclosure (202, 302) that contains the desired part or parts by entering information into the data entry device (218). The customer (802) may also be required to enter into the data entry device (218) the quantity of parts they are retrieving from each secure enclosure (202, 302) that is accessed. Once a secure enclosure (202, 302) is selected the processors (216) will cause the lock (206) to the door (204) to that locker, room or secure area (202, 302) to become unlocked. The customer (802) will then retrieve the part or parts from the secure enclosure (202, 302) and then close the door (204), thus causing the lock (206) to engage and lock the door (204) shut. Information about the customer's access to the unattended inventory facility (808), as well as information about the secure enclosures (202, 302) accessed and the quantities of parts retrieved will be transferred to the central server (806) via the network (812). This information will be stored on the central server (806) and used for inventory management purposes, including reporting, re-stocking decisions and billing purposes.

Access to information stored on the central server (806) is ultimately controlled by the inventory management service (806); however, in some instances the inventory management service (806) may grant levels of access or authority to one or more customers (802). For instance, such access or authority may be granted in an hierarchical manner whereby the customer (802), generally an organization with several unattended facility (808) locations associated with that customer (802), is granted enterprise-wide access and a certain level of control to certain information residing on the central server (806) and in the processors (216). Generally, this will be information pertaining to that specific customer (802). The customer (802) may assign one or more enterprise-wide managers. In a hierarchical fashion, the enterprise-wide manager may grant access and control to certain information to an area manager. The area manager is associated with a subset of the enterprise-wide unattended facilities (808). A site manager may be granted a level of access and control of one or more unattended facilities (808) located at a specific site and that are a subset of the area's unattended facilities (808). A user's access level and control authority is determined by a userid when obtaining access to the central server (806). A customer's (802) control authority may allow them to establish PINs, userids, passcodes, for new users to access the system, among other control functions. The inventory management service (804) maintains a "master" level of control and authority over the entire hierarchical system.

FIGS. 9, 10, 11 and 12 are flow charts illustrating the steps described above for a customer to order and retrieve parts that are kept in the inventory of an unattended inventory facility, for a customer to order parts that are not generally kept in the inventory of an unattended inventory facility and then later pick that order up at an unattended inventory facility, for items to be delivered directly to an unattended inventory facility from a third-party vendor, and for a customer to retrieve parts from an unattended inventory facility without previously having placed an order for the parts, respectively.

Figure 9:
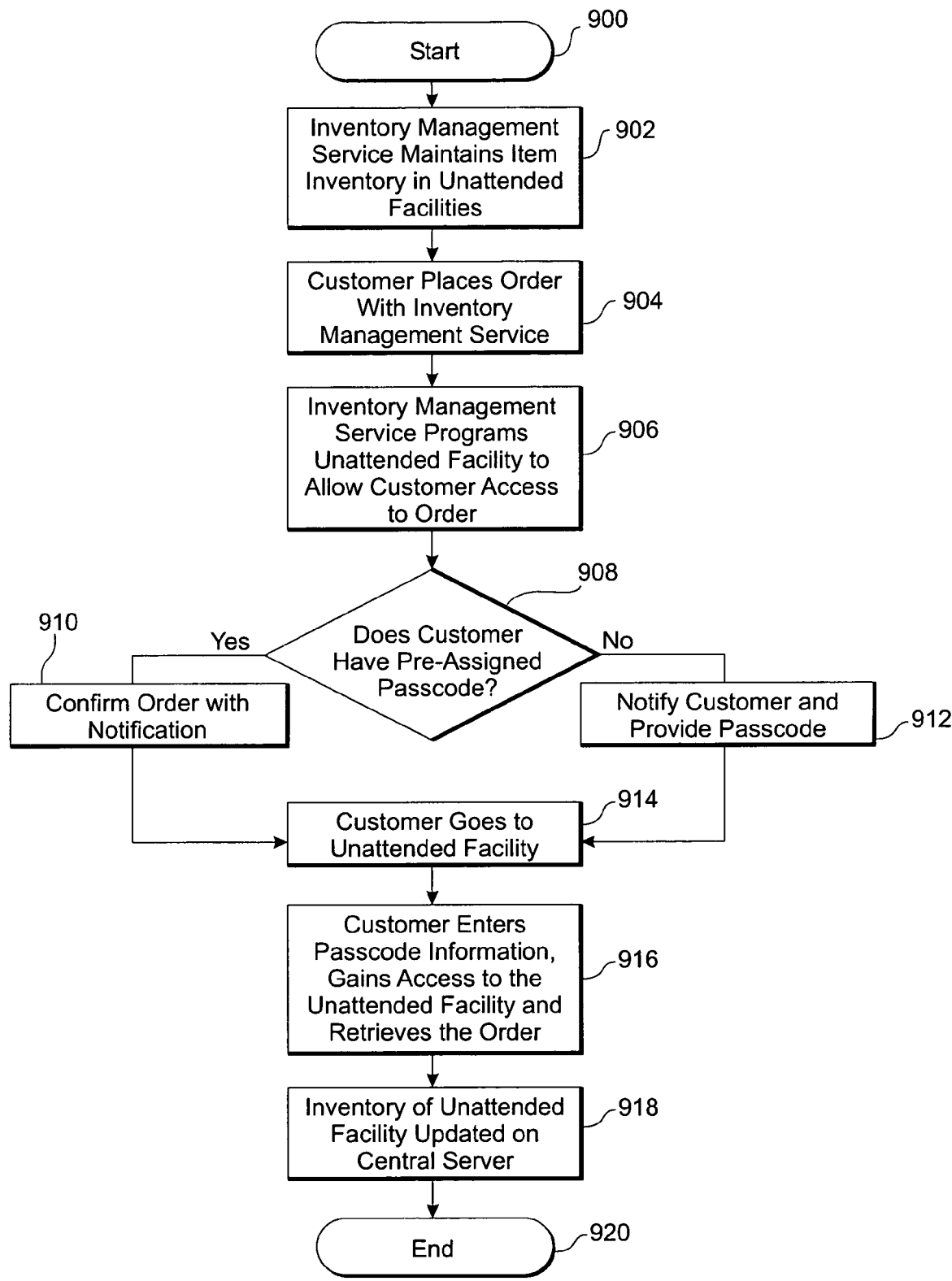
FIG. 9 is an exemplary flowchart describing the steps for a customer to order and retrieve items from an unattended facility that are maintained in the inventory of the unattended facility by an inventory management service in an embodiment of the invention.

In FIG. 9, the inventory management service maintains inventory items in an unattended facility (Step 902). This involves keeping various items in quantities determined by the customer and the customer's use or by the inventory management service in the unattended facility. In Step 904, a customer places and order with an inventory management service. In Step 906 the inventory management service programs the unattended facility to provide the customer with access. This can be done either at the unattended facility through a data entry device or through an interface to the central server via the network. Step 908 determines whether the customer who placed the order has a pre-assigned passcode. If so, then the customer may be provided a notification that confirms the order (Step 910). If not, then the customer is provided a notification including a passcode (Step 912). In Step 914 the customer goes to the unattended facility to retrieve the order. In Step 916 the customer enters passcode information into the data entry device at the unattended facility, gains access to the secure enclosures that contain the items that comprise the order, and retrieves the items. In Step 918, the system automatically updates the inventory of the unattended facility on the central server.

Figure 10:
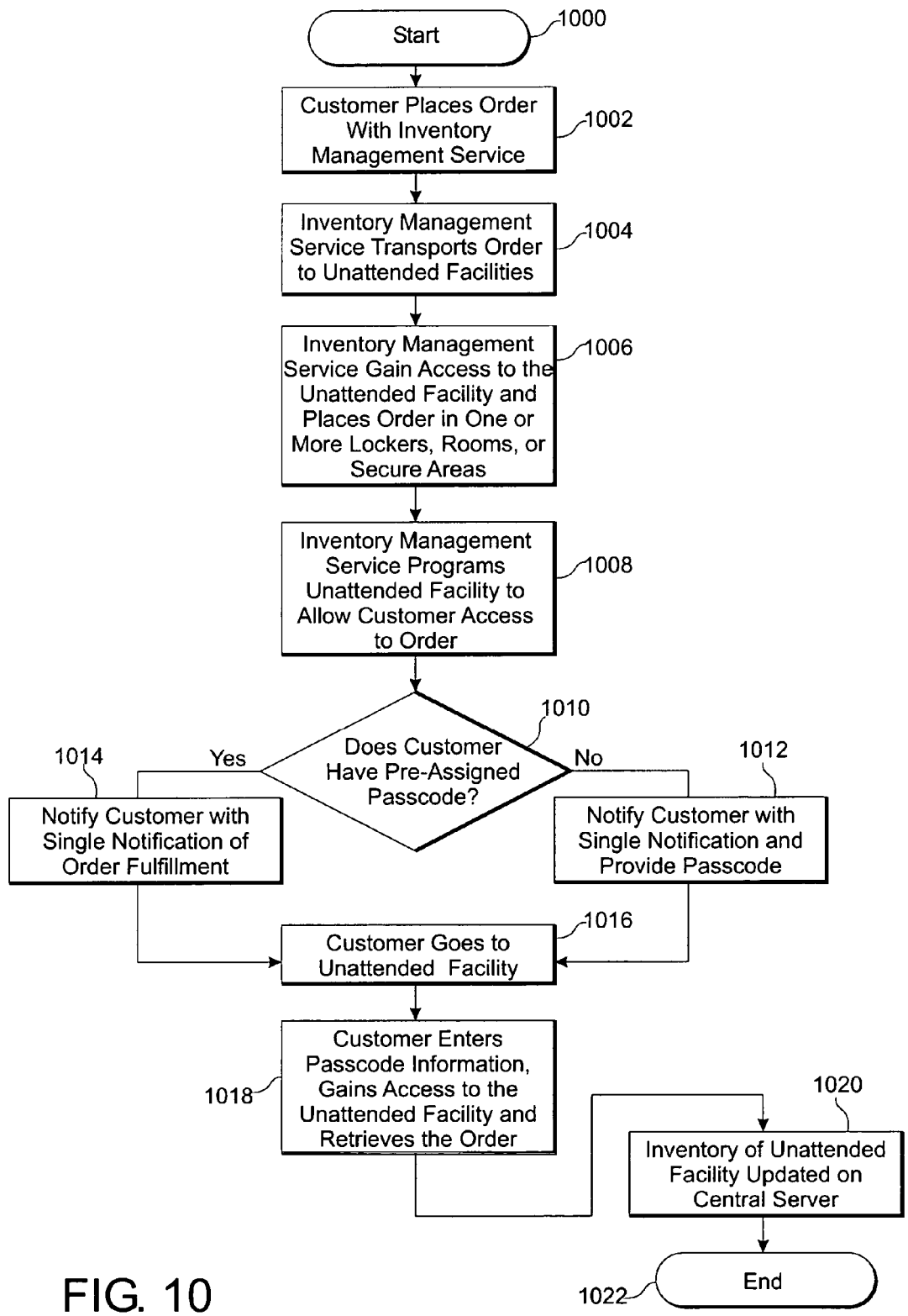
FIG. 10 is an exemplary flowchart describing the steps for a customer to order and retrieve items from an unattended facility that are not normally maintained in the inventory of the unattended facility by an inventory management service in an embodiment of the invention.

In FIG. 10, a customer places an order with an inventory management service (Step 1002). Because in this embodiment the inventory management service does not keep an inventory of the items requested in the order in an unattended facility, the inventory management service transports them to (Step 1004) and places them in an unattended facility (Step 1006). In Step 1008 the inventory management service programs the unattended facility to provide the customer with access. This can be done either at the data entry device of the unattended facility or through the interface with the central server via the network. Step 1010 determines whether the customer who placed the order has a pre-assigned passcode. If not, then the customer is provided a single notification with the notification including a passcode (Step 1012). If the customer does have a passcode, then the customer receives a single notification that the order is now ready for pick up at the unattended facility (Step 1014). In Step 1016 the customer goes to the unattended facility to retrieve the order. In Step 1018 the customer enters passcode information into the data entry device at the unattended facility, gains access to the secure enclosures that contain the items that comprise the order, and retrieves the items. In Step 1020, the system automatically updates the inventory of the unattended facility on the central server.

Figure 11:
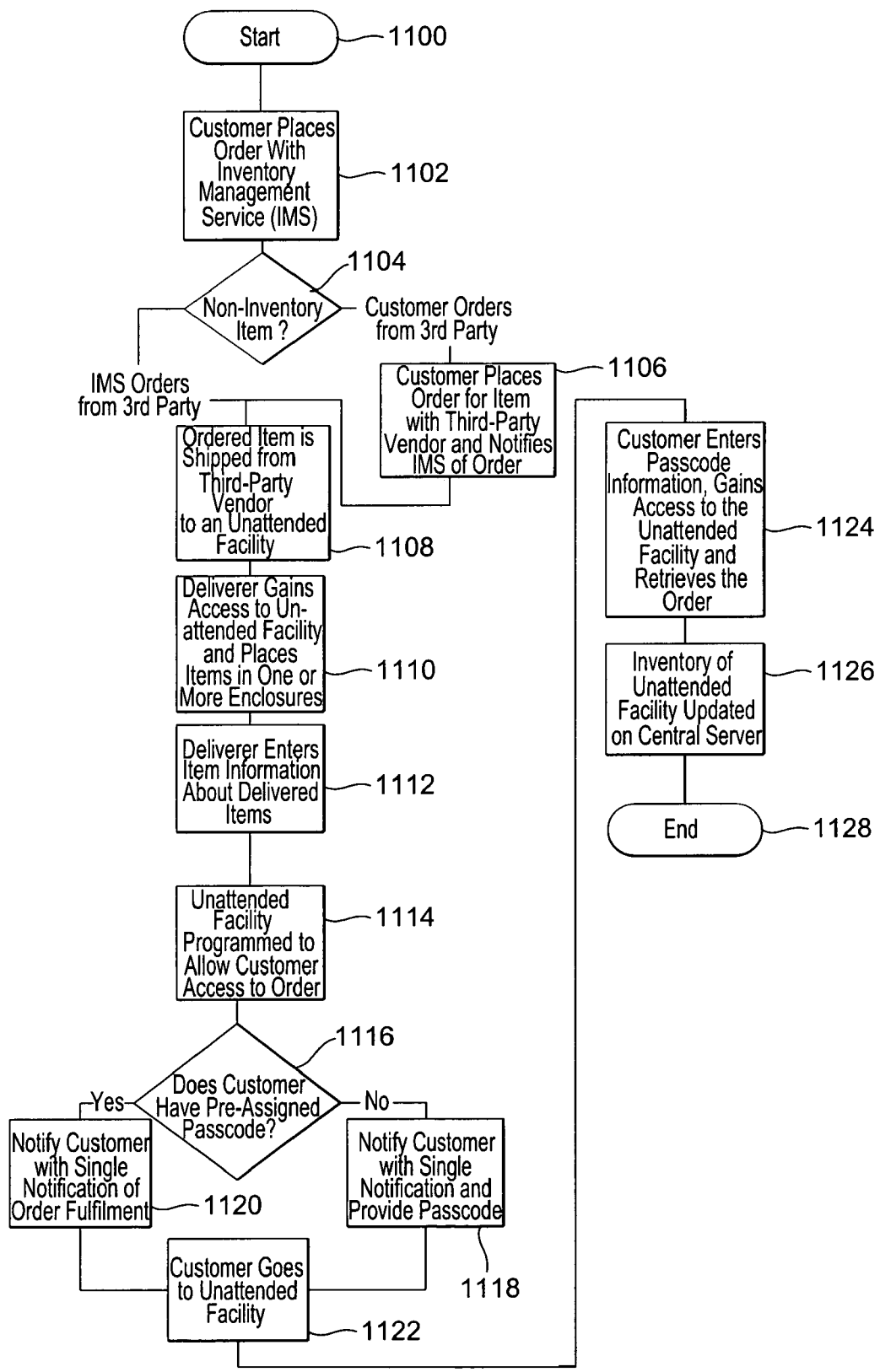
FIG. 11 is an exemplary flowchart describing the steps for the entry of inventory information into an exemplary system of an embodiment of the invention for items delivered directly to an unattended facility.

In FIG. 11, a customer places an order with an inventory management service (Step 1102). Because in this embodiment the inventory management service does not keep an inventory of the items requested in the order in an unattended facility or in a central warehouse, in Step 1104 either the inventory management service or the customer orders the items from a third-party vendor. If the customer orders the item, then in Step 1106 the customer notifies the inventory management service of the order. Notwithstanding whether the items are ordered by the inventory management service or the customer, the ordered items are shipped from the third-party vendor and transported to an unattended inventory facility (Step 1108). In Step 1110, the deliverer of the item (or items) gains access to the unattended facility and the secure enclosures of the unattended facilities and places the item or items in one or more of the secure enclosures. In Step 1112 information about the parts that have been delivered to the unattended facility is entered at the unattended facility and transmitted to the inventory management service's inventory management system. In Step 1114, the unattended facility is programmed to provide the customer with access. This can be done either at the data entry device of the unattended facility or through the interface with the central server via the network. Step 1116 determines whether the customer who placed the order has a pre-assigned passcode. If not, then the customer is provided a single notification with the notification including a passcode (Step 1118). If the customer does have a passcode, then the customer receives a single notification that the order is now ready for pick up at the unattended facility (Step 1120). In Step 1122, the customer goes to the unattended facility to retrieve the order. In Step 1124, the customer enters passcode information into the data entry device at the unattended facility, gains access to the secure enclosures that contain the items that comprise the order, and retrieves the items. In Step 1126, the system automatically updates the inventory of the unattended facility on the central server.

Figure 12:
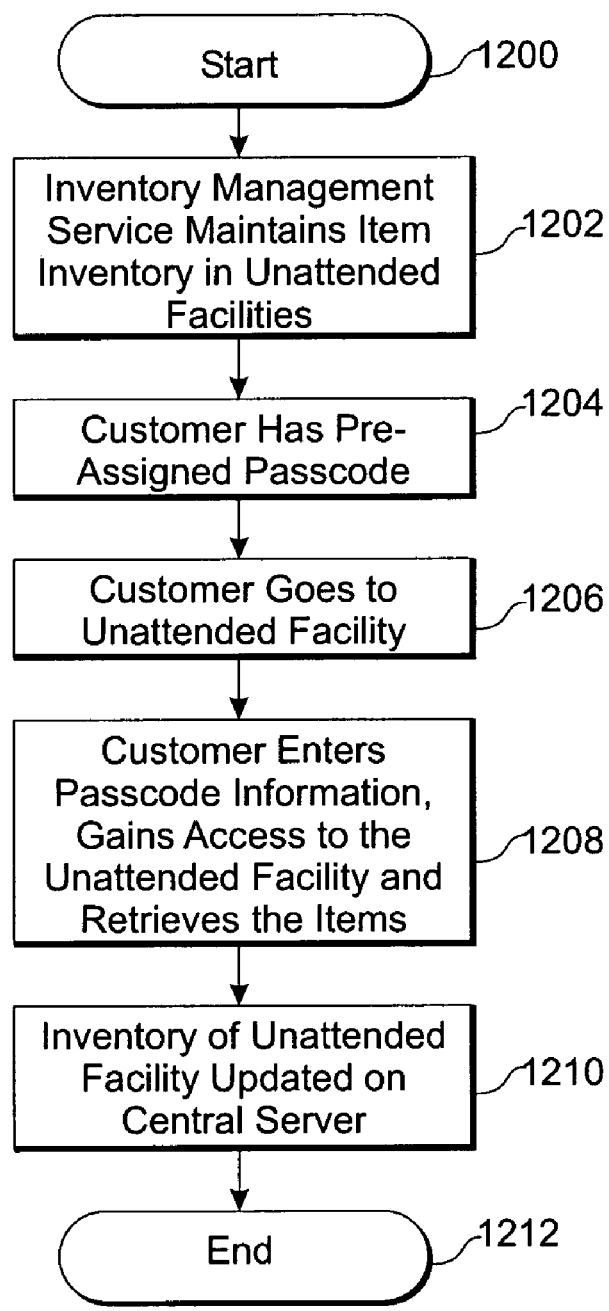
FIG. 12 is an exemplary flowchart describing the steps for a customer to retrieve items from an unattended facility that are maintained in the inventory of the unattended facility by an inventory management service in an embodiment of the invention.

FIG. 12 describes the steps for a customer who has a pre-assigned passcode to retrieve items from an unattended facility without first ordering such items from the inventory management service. An inventory management service maintains an inventory of items in an unattended facility (Step 1202). In Step 1204, it is provided that the customer has a pre-assigned passcode. The customer then goes to the unattended facility (Step 1206). The customer then enters the pre-assigned passcode into the data entry device to gain access to the unattended facility and the secure enclosures that contain the items sought by the customer. The customer may also be required to indicate the items being retrieved and the quantity of each item. The customer then retrieves the items (Step 1208). In Step 1210, the inventory of the unattended facility is automatically updated on the central server from the passcode information entered by the customer, any additional customer entered information and from the monitoring of the doors of the secure enclosures of the unattended facilities by the processors.

Figure 13A:
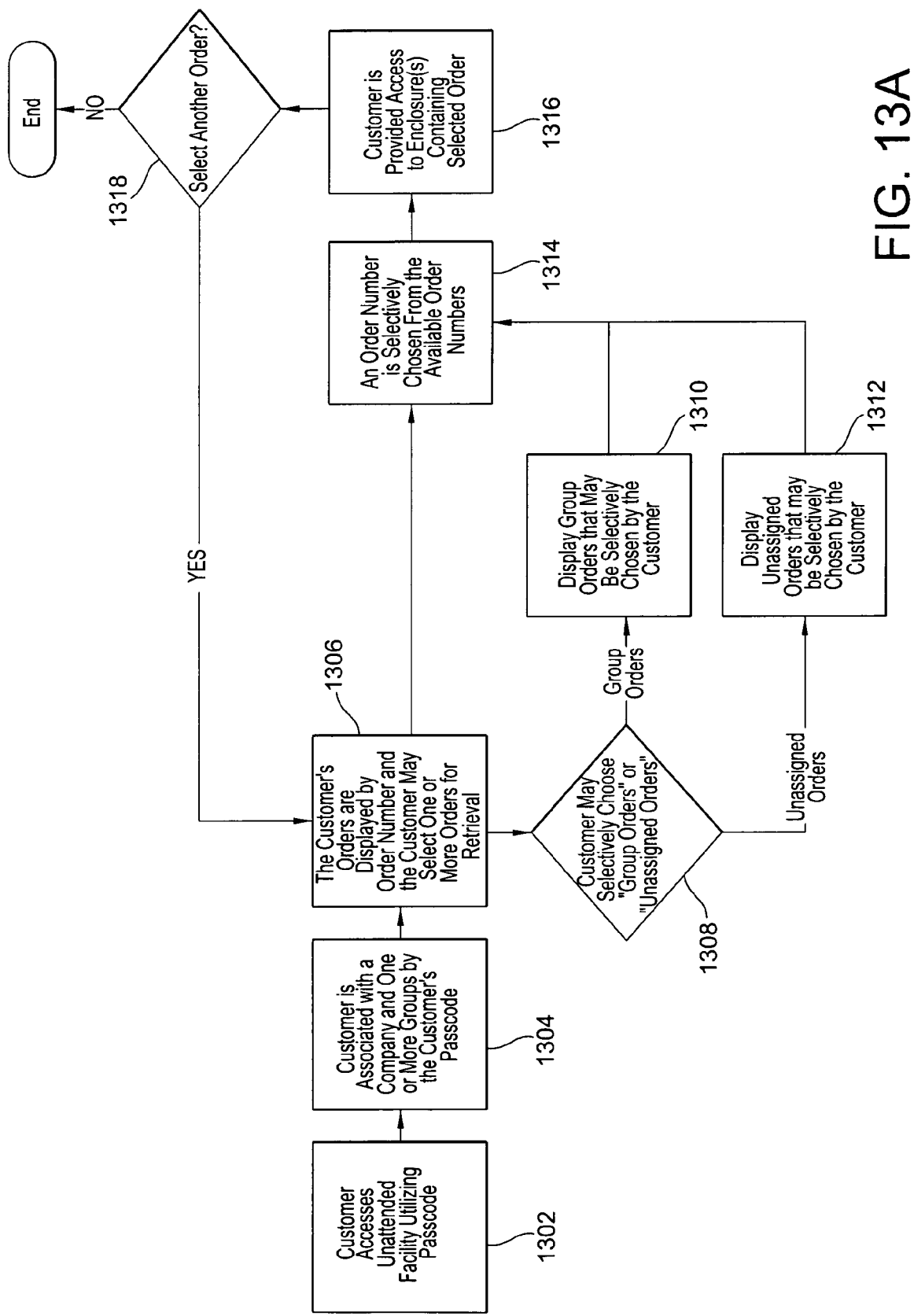
FIG. 13A is an exemplary block diagram describing the steps for a customer to interact with a data entry device at an unattended facility when retrieving an item from the unattended facility in an embodiment of the invention.

FIG. 13A is an exemplary block diagram of the options available to a technician when picking-up an order from an unattended facility (808) in an embodiment of the invention. In Block 1302, a technician gains access to the unattended facility (808) by entering (or scanning or having read) an access code, passcode, userid, etc. (a "passcode") into a data entry device (218). The technician is known to the unattended facility system by having a set level of authorization pre-programmed into the processors or the central server corresponding to that person's passcode. The technician may be associated with a company or organization, and in Block 1304, the technician's passcode, once entered into the data entry device, will associate the technician with the proper company. The unattended facility display (220) will then display order numbers that are in the unattended facility (808) that are associated with that technician in Block 1306. Technicians are associated to orders by the technician's passcode (Block 1306). The technician may have the option (1308) to display "Group Orders" or "Unassigned Orders." A customer (in this instance, the company) establishes a group and designates one or more technicians by the technicians' passcode that belong to the group. If a customer has some level of hierarchical control over the unattended facilities system, as previously described, the customer may be able to create groups and add or delete people from them. Group Orders (1310) are orders that have been placed by other members of that group and that are now ready to be retrieved from that unattended facility. Group Orders do not necessarily include all orders assigned to group members, as certain orders may be limited such that they may be viewed and selected only by the assigned technician. Each technician may be assigned orders (by the technician's passcode) that may only be viewed and selected by the technician possessing the assigned passcode. Unassigned Orders (1312) are orders that have been placed by a customer, but not necessarily by an individual technician (i.e., may have been placed by office personnel of the customer), that are ready to be retrieved from that unattended facility. In Block 1314, the technician will make a choice of an order to retrieve, whether it is the technician's order, a Group Order, or an Unassigned Order. If a technician selects a Group Order or an Unassigned Order, then the order that is selected will become assigned to that technician and such assignment will be recorded in the inventory management system. If one or more return items are expected in association with the selected order, then the ordered item(s) will be placed in the technician's "loan file" (as previously described) until the return parts are returned to the inventory management service. If the return item is not returned to the inventory management service within a predetermined time period thereby closing out the "loan file" for that item, the technician (or the customer) may received one or more "nagging" notifications requesting return of the part.

Once an order is selected, the secure enclosure or enclosures where the order is located will then be opened in Block 1316 and the order will be available for retrieval by the technician. The technician may then select another order from the technician's orders, Group Orders, and Unassigned Orders until all the orders that are available to that technician have been retrieved or the technician no longer desires to retrieve any additional orders (Block 1318). This system facilitates the ordering and retrieval of items by a customer such that if a particular technician is absent or unavailable, another technician associated with that customer might retrieve the absent technician's order. Time-stamping of transactional information as well as video monitoring help control accountability problems with item retrieval.

Figure 13B:
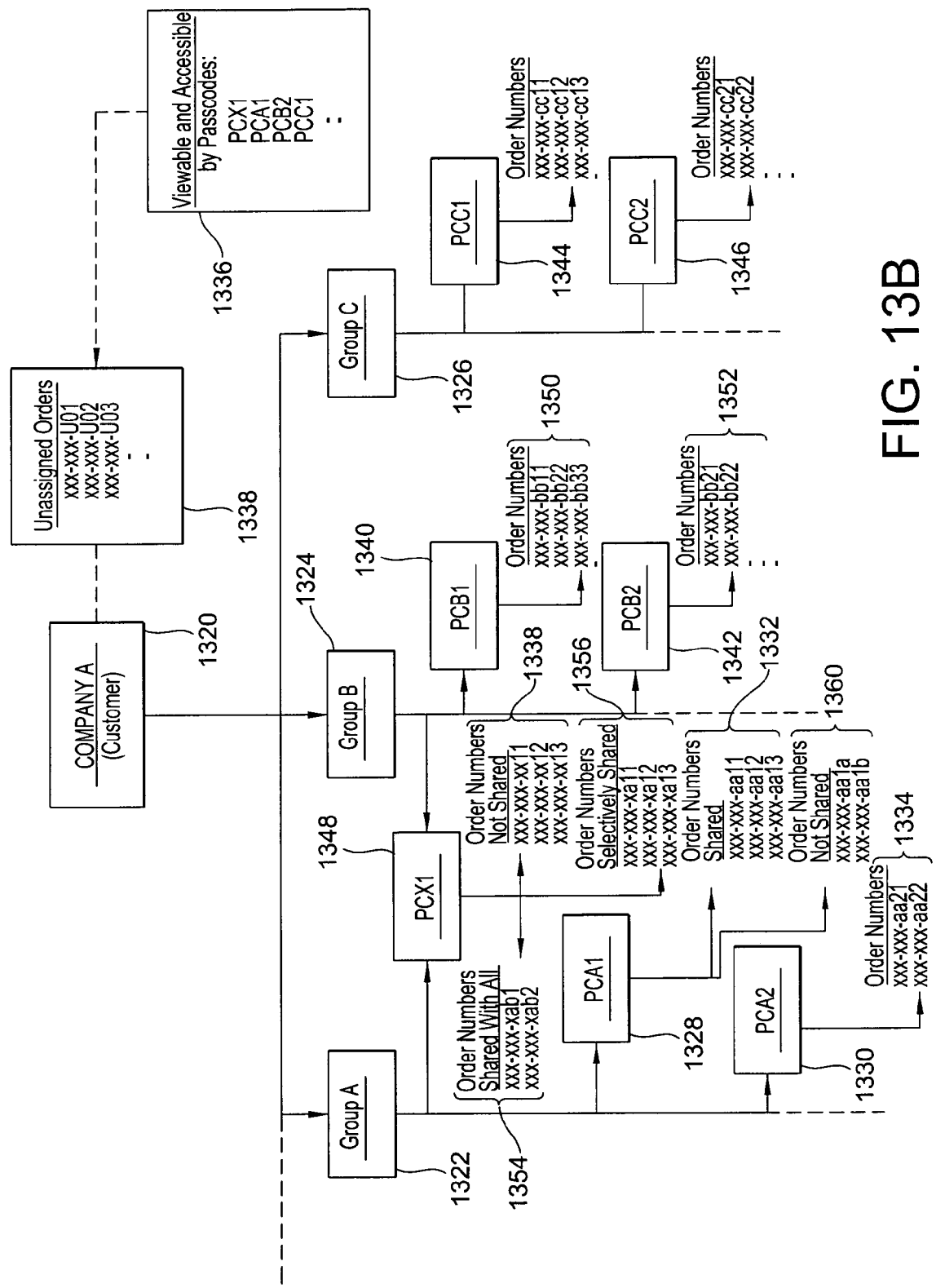
FIG. 13B is an exemplary block diagram describing the steps for a customer to interact with a data entry device at an unattended facility to retrieve the customer's own orders, group orders or unassigned orders when retrieving an item from the unattended facility in an embodiment of the invention.

As an illustrative example of the pick up transactions involved with group assigned and unassigned orders, consider the example shown in FIG. 13B. A customer (e.g., Company A) (1320) has established groups A (1322), B (1324), and C (1326), although more or fewer groups may be established. In each of these groups (1322, 1324, 1326), the customer (1320) has assigned the passcodes of technicians. For instance, technicians, with the passcodes PCA1 (1328), PCA2 (1330), etc. are assigned to Group A (1322), technicians with passcodes PCB1 (1340), PCB2 (1342), etc. are assigned to Group B (1324), technicians with passcodes PCC1 (1344), PCC2 (1346), etc. are assigned to Group C (1326), etc. Certain technicians such as, for example, a supervisor, may be assigned a passcode that assigns them to all groups, or more than one group. As shown in FIG. 13B, for example, the technician with the passcode PCX1 (1348) is assigned to both, Group A (1322) and Group B (1324).

When accessing an unattended facility, a technician assigned to Group A (1322) such as, for example, the technician with the passcode PCA1 (1328), may see that technician's own orders (1332), and may selectively choose to see orders (1334) that have been placed by other technicians within that group (1322), such as, for example, orders that are assigned to a technician with passcode PCA2 (1330) that are in the unattended facility and ready for pick up. However, certain orders (1360) assigned to group members may be limited to being viewed and selected by only the originally assigned technician. For instance, the technician with the passcode PCA1 has orders assigned (1360) that may not be viewed and selected by other group members (1348, 1330). If desired, the technician (PCA1) (1328) may selectively choose to have one or more of the other technicians' shared orders (1334) re-assigned from the other technician, such as, for example, technician PCA2 (1330) to technician PCA1 (1328) and retrieve these orders (1334) from the unattended facility. Furthermore, the technician (PCA1) (1328) may be assigned to a group (1336) that can see and retrieve orders (1338) that have been placed by Company A (1320), but not placed by any particular technician (i.e., unassigned orders). The technician (1328) selectively chooses to display such orders (1338) and selectively chooses one or more orders for retrieval. By selecting an order for retrieval, the previously unassigned order (1338) becomes assigned to the technician (1328).

If a technician is assigned to more than one group such as, for example, the technician with the passcode PCX1 (1348) who is assigned to both Group A (1322) and Group B (1324), the technician (1348) is able to view and select orders (1332, 1334, 1350, 1352) that are assigned to any member (1328, 1330, 1340, 1342) of Group A (1322) or Group B (1324), unless the ability to view and select such orders (1360) has been limited. The technician with passcode PCX1 (1348) may also have orders (1354, 1356, 1358) that are assigned to that technician (1348) that are in the unattended facility and ready for pick up. These orders (1354, 1356, 1358) may be in at least three separate classifications. For instance, some of these orders (1354) may be shared with the members (1328, 1330, 1340, 1342) of each group (1322, 1324) that the technician assigned passcode PCX1 (1348) belongs. Here, for example, technicians belonging to Group A (1322) or Group B (1324) may view and select certain orders (1354) that are assigned to the technician with the passcode PCX1 (1348). Other orders (1356) may only be shared with a subset of the groups (1322, 1324) of which the technician with passcode PCX1 (1348) belongs. For instance, although the technician with passcode PCX1 (1348) belongs to Group A (1322) and Group B (1324), the technician (1348) may be assigned orders (1356) that may only be viewed and selected by members (1328, 1330) of Group A (1322), and not by members (1340, 1342) of Group B (1324). Finally, the technician with passcode PCX1 (1348) may be assigned orders (1358) that may only be viewed and selected by that technician (1348).

Each of the access levels for technicians described above in reference to FIGS. 13A and 13B may be programmed into the processors (216) of the unattended facility (200) via a data entry device (218), or may be transmitted from the central server (106) to the unattended facility (200) via the network (108).

In one embodiment, more than one person may receive notification that a Group Order is ready for pick-up. The central server (806) may be encoded to send a single notification to one or more persons that are associated with a customer such as, for example, all technicians in a particular group. The notification may also be sent to a customer's office, dispatch center, etc. Notification may be an electronic transmission such as a page, telephone call, facsimile, email, etc, as previously described. Authority to notify more than one person of the placement of items in an unattended facility may be given to a customer by the inventory management service. If an order has not been retrieved within a predetermined time period after notification to the customer, the customer may receive one or more "aging" notifications from the inventory management service. In some instances the inventory management fee may institute a fee or fees for orders that are not picked up in a timely fashion. If the customer is substantially delinquent in retrieving an order after notification, the order may be returned to the centralized warehouse or to another location and the customer assessed a restocking/handling fee.

Figure 14:
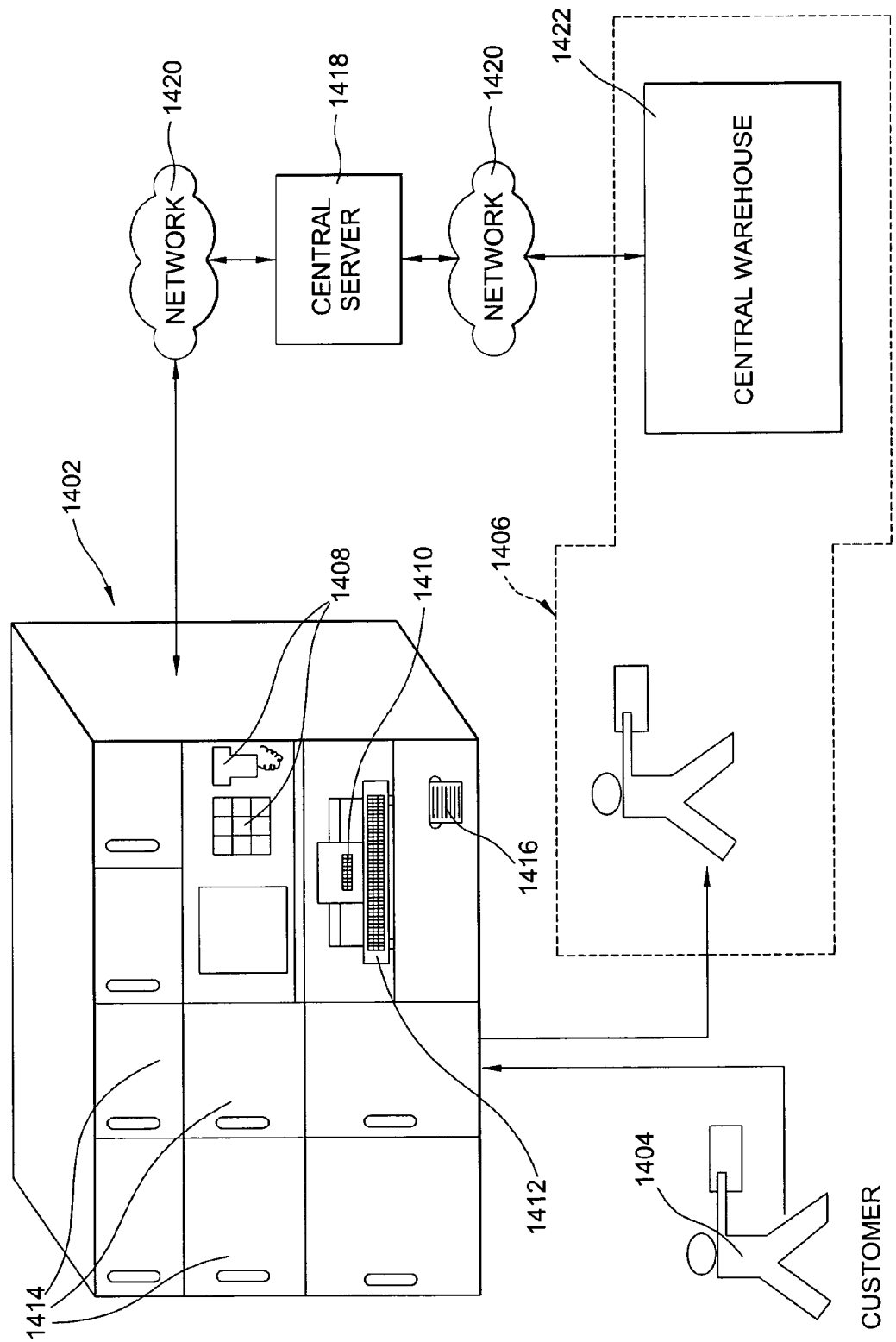
FIG. 14 is a pictorial view of an exemplary embodiment of a system for a customer to return items to an unattended drop off facility and for these items to be retrieved by an inventory management service in an embodiment of the invention.

FIG. 14 illustrates another embodiment of the present invention involving an unattended drop off facility (1402). Parts received by a customer (1404) but not used may need to be returned by the customer (1404) to the inventory management service (1406). Further, used or damaged parts may need to be returned to the inventory management service (1406) or a manufacturer for repair or warranty purposes. It may be very inconvenient for a customer (1404) to obtain a return authorization and then return the part to the inventory management service (1406) or manufacturer, or to prepare it for shipment and have it shipped to the inventory management service (1406) or manufacturer. Returned parts also may be processed more effectively and efficiently by the inventory management service (1406) or manufacturer if they have advanced information about the part being returned such as, for example, the type and model of the part, the reason for return, whether the part has been used or is unused and whether it is "good," "bad" or returned under "warranty," the customer (1404) that is returning the part, etc.

An unattended drop off facility (1402) utilizes an unattended facility similar to the facility (200) as shown in FIG. 2 and described above. Similar to an unattended inventory facility (808), an unattended drop off facility (1402) may also utilize secure enclosures comprised of lockers, rooms or secure areas (1414). A customer (1404) returning a part to an unattended drop off facility (1402) first enters a passcode into a data entry device (1408) at the unattended drop off facility (1402). This passcode may be pre-assigned and reusable by the customer (1404), or it may be assigned for the purposes of returning this particular item. For example, the customer (1404) may have a permanently assigned passcode that provides the customer (1404) with access to the unattended drop off facility (1402), or the customer (1404) may contact the inventory management service (1406) through a communications device (118, 418) and be assigned a passcode that may limit the number of times or the amount of time in which the customer (1404) may access the unattended drop off facility (1402). The customer (1404) will then enter certain return information into the data entry device (1408). This return information may include, for example, a user ID, a company name, return type (i.e., "good," "bad," "warranty"), a return reason (for a "bad" part), a part number, a requisition or order number, etc. As previously described, the amount of information that a customer (1404) must enter may be reduced (1404) if the return item is associated with a reference such as, for example, an Intelligent ARS label, order number, etc. and information about the new part, the returned part, the transaction, etc. has previously been stored on the central server (1418).

If needed, the customer (1404) may also create a return identifier (1410) that is associated with the return part. The return identifier (1410) provides information about the return part and the customer (1404) such as whether the part is "good" or "bad", the customer's name (or company name), etc. Such information may be encoded upon the return identifier (1410) or it may be in text. The customer (1404) may selectively initiate generation of the return identifier (1410) (e.g., print return labels or encode an RFID tag) as needed for the return part. For example, the system may allow the user to specify: (1) that they don't need any return identifier; (2) that they need a "defective part" return identifier; or (3) that they need a "non-defective part" return identifier. The return identifier (1410) may take the form of a barcode, a non-programmable RFID tag, a programmable RFID tag, etc. The unattended drop off facility (1402) may have a device such as, for example, a barcode printer (1412), an RFID programmer, etc., that has the ability to create the return identifier (1410) from information entered into the data entry device (1408). Alternatively, rather than selectively initiating the generation of the return identifier, the required return identifier (1410) may be automatically generated by the return system based upon the return information. In other embodiments, the return identifier (1410) may be pre-existing, categorized as to whether the return part is "good" or "bad", and associated with the return part by the customer (1404). These pre-existing return identifiers (1410) may be provided in bulk at the unattended drop off facility (1402) location. Alternatively, the return part may already have a return identifier (1410) (e.g., barcoded return label or an RFID tag) associated with it. In that instance, the unattended drop off facility's (1402) system allows the customer (1404) to scan the return identifier (1410) thus reducing the amount of information that the customer (1404) will have to enter about the return part and the transaction.

Once the return identifier (1410) is associated with the return part by the customer (1404), the customer (1404) is given access to a secure enclosure (1414) in which to place the return part. The unattended drop off facility (1402) may be designed in such a manner that all return parts are placed in a single secure enclosure (1414) or else it may be designed where each returned part is placed in an individual secure enclosure (1414). The customer (1404) places the return part in the secure enclosure (1414) and closes the door (204) thus locking the return part within the secure enclosure (1414). The customer (1404) may then be provided a receipt (1416) from the unattended drop of facility system (1402) for the return transaction as documentation of returning the part. The return information entered into the data entry device (1408) will be sent to the central server (1418) via the network (1420). This return information will be used for pre-processing of the return part by the inventory management service (1406). Pre-processing will allow the inventory management service (1406) to more effectively and efficiently handle the returned part if it is returned to the central warehouse (1418). It can also facilitate decisions as to whether the returned part will be repaired, placed back into inventory, returned to a manufacturer, scrapped, etc.

The return information may also enable the inventory management service (1406) to make inventory logistics decisions. An alternative embodiment of the unattended drop off facility (1402) is where the unattended drop off facility (1402) is incorporated into or co-located with an unattended inventory facility (808). Here, upon the entry of the return information by the customer (1404), if the return part is "good," the return system electronically checks inventory levels of the return part at the associated unattended inventory facility (808). If the inventory of that part at the associated unattended inventory facility (808) (on-hand and in-transit) is below its maximum authorized quantity, the inventory management service (1404) will place the returned "good" part into the proper secure enclosure (1414) to which that part is assigned and the "on-hand" inventory of that part for that unattended inventory facility (808) will be increased. If the inventory of the unattended inventory facility (808) is at or above its maximum authorized quantity, the return part will either be transported to the central warehouse (1422) for further disposition or to another unattended inventory facility (1408). Alternatively, if the inventory of the returned part at the associated unattended inventory facility (808) (on-hand and in-transit) is below its maximum authorized quantity, the inventory management service (1404) may leave the returned part in the secure enclosure (1414) as it was placed by the customer (1404), and that secure enclosure (1414) will then be updated on the central server as containing a "good" item available to be included in the inventory of the associated unattended inventory facility (808), and the "on-hand" inventory of that part for that unattended inventory facility (808) will be increased.

This system serves to rapidly distribute inventory to locations where it is most needed. Transportation and transactional costs may also be reduced as the returned "good" part is not always transported to a central warehouse and then distributed back to the unattended secure locker/rooms.

If the returned part is placed in an unattended drop off facility (1402) that is not co-located with an unattended inventory facility (1408), then a "good" part may be retrieved from the unattended drop off facility (1402), transported to the central warehouse (1422) and placed in inventory there, or placed in inventory at another unattended inventory facility (808). If the part is "bad" it will be retrieved from the unattended drop off facility (1408) and transported to the central warehouse (1422) for further processing by the inventory management service (1406), to a repair facility, discarded, or further dispositioning.

When retrieving a returned part from an unattended drop off facility (1402), the inventory management service (1406) may utilize its own personnel, an agent or a courier to retrieve the parts. The parts may be retrieved on a scheduled basis or they may be retrieved promptly after placement in the unattended drop off facilities (1402). If the unattended drop off facility (1402) is co-located with an unattended inventory facility (808) then parts may be retrieved by the inventory management service (1406) at the same time the unattended inventory facility (808) is being re-stocked. When retrieving parts from an unattended facility (808, 1402) a passcode is entered into the data entry device (1408). This passcode allows the person retrieving the parts access to the lockers, rooms or secure areas (1414) that contained the returned parts placed there by customers (1404). The "good" retrieved parts may also be placed in other unattended inventory facilities (808) rather than being brought to a central warehouse (1422) in order to maintain parts inventories in other unattended inventory facilities (808).

Figure 15:
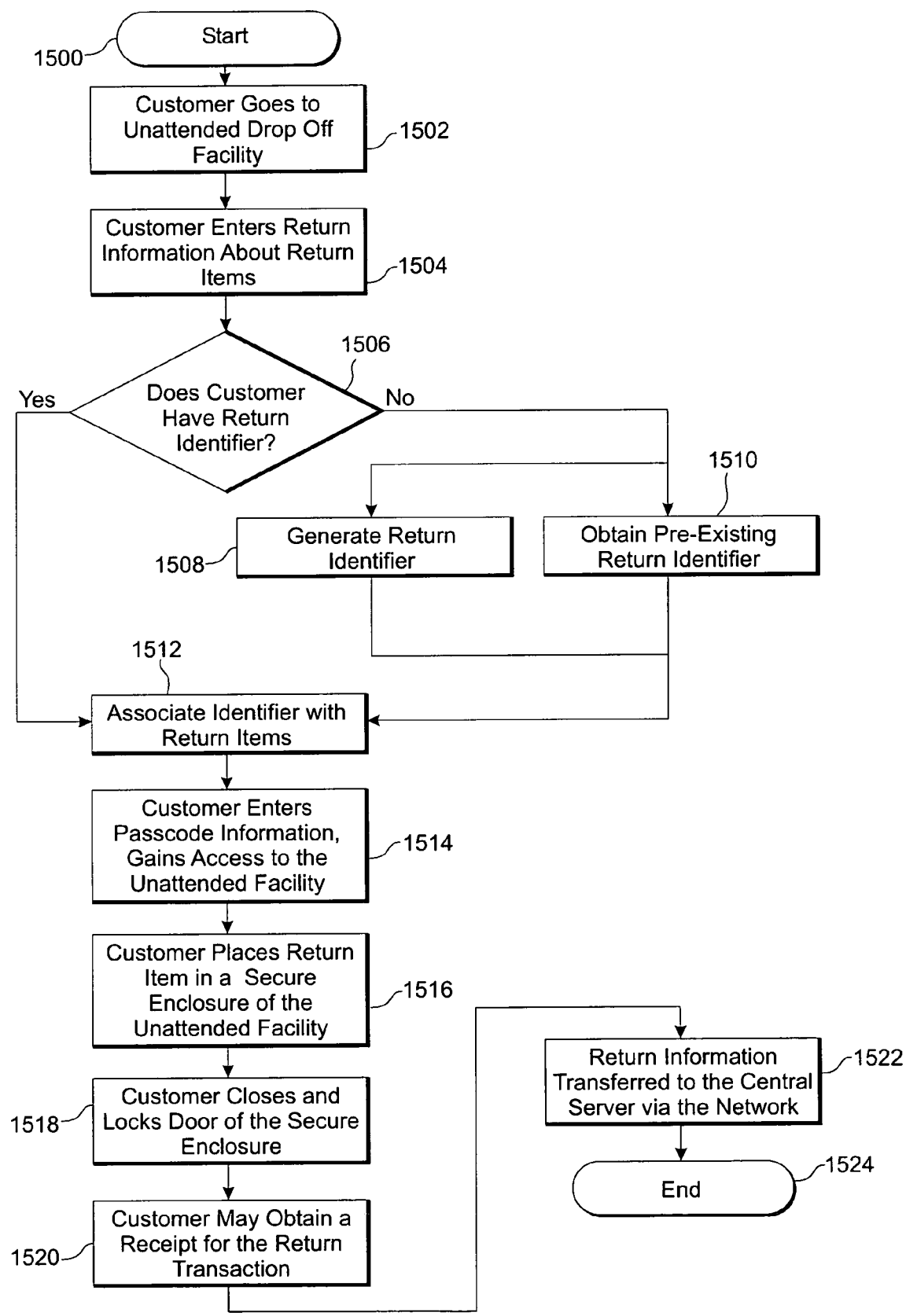
FIG. 15 is an exemplary flowchart of the steps for a customer to return items to an unattended drop off facility and for these items to be retrieved by an inventory management service in an embodiment of the invention.

FIG. 15 is a flow chart describing the steps to utilize an unattended facility for the return of items. In Step 1502, the customer transports a return item to an unattended drop off facility. The customer then enters return information about the return item into the data entry device at the unattended drop off facility (Step 1504). It is then determined whether the return item has a return identifier (Step 1506). If not, then a device at the unattended drop off facility is used to generate a return identifier from the entered return information (Step 1508), or a pre-existing return identifier is obtained (Step 1510). The return identifier is then associated with the return item (e.g., by attaching it to the return item) (Step 1512). In Step 1514, the customer then utilizes a passcode to access the unattended drop off facility. This may be a passcode that was pre-assigned to the customer or one that was assigned just so the customer may return the specific items. The customer then places the return item into a secure enclosure of the unattended drop off facility (Step 1516). The door of the secure enclosure is then closed and locked (Step 1518). The customer may then obtain a receipt for the return transaction (Step 1520). Information about the return item is then transferred to the central server via the network to begin pre-processing of the return item (Step 1522).

The previously described systems comprised of an unattended facility connected to a central server via a network with an interface with an inventory management service enable the inventory management service to monitor and control inventory levels of parts contained within the unattended inventory facilities. When a person gains access to an unattended facility by use of a passcode, unlocks the door of a locker, room or secure area (either automatically or selectively) and places parts into or removes parts from the secure enclosure, such information is electronically monitored by the processors and transferred to the central server via the network where it is recorded. In this manner, the inventory of parts in individual lockers, rooms or secure areas of unattended facilities may be tracked. This parts inventory may be monitored by software applications that utilize the parts inventory information to determine whether the inventory of parts in an unattended inventory facility is below a predetermined minimum level. The software may also generate reports on such information.

If the inventory of a particular part in a particular unattended inventory facility is below the predetermined minimum level, then the software application will automatically create a re-stocking or replenishment order that is transmitted to the interface of the inventory management service. The re-stocking order may include, for example, identification of the unattended inventory facility that is to be re-stocked, a unique code assigned to each part stocked in a locker, room or secure area of an unattended inventory facility, a part number, etc. Once a restocking order is received by the inventory management service, an advanced shipping notification ("ASN") of some or all of the items to be re-stocked will be created. The ASN includes an estimated time for restocking that is assigned by the inventory management service or is generated by the inventory management system based on known restocking parameters and is related to the re-stocking order. A re-stocking order may be associated with one or more ASNs. Additional parts will be obtained from the central warehouse, manufacturers or third-party vendors (if necessary) by the inventory management service for re-stocking. Once the unattended facility is restocked with the items indicated on the ASN, the ASN will be removed from the inventory management system. However, if the ASN is not removed by it estimated restocking date, an exception report may be created indicating there has been a delay in re-stocking. This exception report may be generated automatically or manually by the inventory management system.

The parts will be transported to the unattended inventory facility that has an insufficient parts inventory, the re-stock person will enter a passcode that allows them access to the unattended inventory facility and to the secure enclosures that contain or are supposed to contain the parts that have an insufficient inventory. This passcode may have been automatically generated by the central server and transmitted to the central warehouse or supplier via the re-stocking order. The re-stock person will place additional parts in the secure enclosures such that the predetermined minimum inventory level of that part for that unattended inventory facility will be met or exceeded but the predetermined maximum inventory level of that part will not be exceeded. Likewise, such monitoring can be used to control whether "good" parts removed from an unattended drop off facility that is co-located with an unattended inventory facility may be placed into the inventory of the unattended inventory facility or whether they should be taken to the central warehouse for inventory consolidation or distributed to other unattended inventory facilities. The system will then notify the inventory management service via the central server that the particular part has been restocked at that site and the inventory quantity will be increased.

Closely related to the return parts system and method is the concept of a purge parts order. In some instances, items that are held in inventory in an unattended facility may become obsolete, expired, out-dated, stale, may be recalled, etc. In those instances the customer may notify the inventory management service of the need to remove the items from inventory or the inventory management service may become aware of such need from other sources such as, for example, a manufacturer. The inventory management service will create a "purge order" for the item to be removed from inventory. The purge order is created in the inventory management system and includes an estimated date for removing the item(s) from one or more unattended facilities. Once the item(s) identified on the purge order are removed from inventory, the purge order will be closed. If the items have not been removed by the estimated removal date, an exception report may be generated either automatically or manually indicating the removal is past due.

Figure 7:
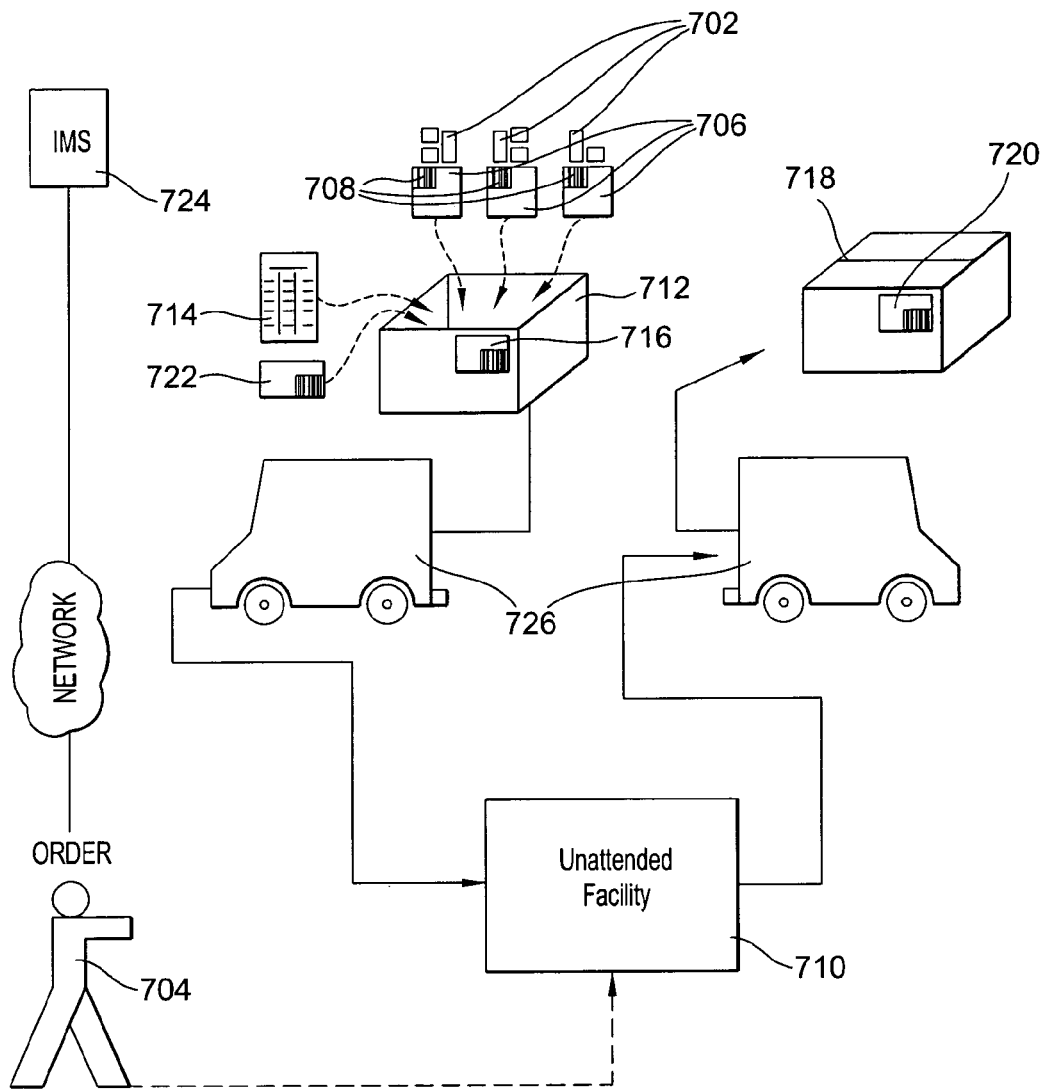
FIG. 7 is an exemplary diagrammatic representation of the consolidated shipping of items to and from an unattended facility in an embodiment of the invention.

Similar to the concept of consolidated shipment of ordered items to an unattended facility as previously described, in other embodiments (as shown in FIG. 7) return items from one or more unattended facilities (710) may be packaged for return shipping in a consolidated return shipping package (718). Inventory management service personnel, agents of the inventory management service, couriers, shipping service personnel, etc, may perform this packing.

Return items may also be sorted as they are packed. Return items may be sorted by their status ("good," "bad," etc.), their type, manufacturer, etc. and packaged separately (in separate consolidated return shipping packages (718)) depending upon such sortation.

More than one return item is packaged in a consolidated return shipping package (718) depending upon the size and weight of the return items. A tracking identifier (720) is associated with the consolidated return shipping container (718). The return identifier of each return item (not shown) within a consolidated return shipping container (718) is linked with that return shipping container's tracking identifier (720). In this manner, return items within a consolidated return shipping container (718) may be tracked as if shipped or transported individually.

The tracking identifier (720) of the consolidated return shipping container (718) may be incorporated into a shipping label. In one embodiment, the consolidated return shipping container (718) is associated with an Intelligent ARS label (722). As previously described, Intelligent ARS is a system is that processes item order requests against one or more rules and generates return shipping labels that are printed and enclosed in packages with the items. The Intelligent ARS label (722) is used to identify the status of the return item and insure the timely return of both used and unused items to a facility equipped to handle them. The Intelligent ARS label (722) may be provided with an item when the inventory management service (724) requires or is aware of the need to return an item in exchange for the new one. If a group of items are to be exchanged such as, for example, under a warranty replacement or recall program, one Intelligent ARS label (722) may be provided with a group of new items to be used for the consolidated return shipping of the old (exchanged) items. In other embodiments, an Intelligent ARS label (722) may be provided in a consolidated shipping container (712) of items to an unattended facility (710). The consolidated shipping container (712) and the Intelligent ARS label (722) will be set aside and kept for the return shipping of items from the unattended facility (710). Return items will be packed into the return shipping container (718) and the Intelligent ARS label (722) affixed for return shipment of the return items.

Return items packaged in return shipping containers (718) may be picked up at the unattended facility (710) by the shipping service (726) and delivered to the location indicated on the return shipping label (720). Otherwise, return items are retrieved from unattended facilities (710) by inventory management service personnel, agents of the inventory management service, couriers, etc. in the manner previously described. Just as orders delivered to an unattended facility may be accomplished more efficiently by consolidating multiple courier runs into fewer deliveries to unattended facilities, return shipping may be perform in a consolidated manner in a process where the return items are brought to an unattended facility and aggregated for return, as opposed to individual shipments from customers.

Figure 16:
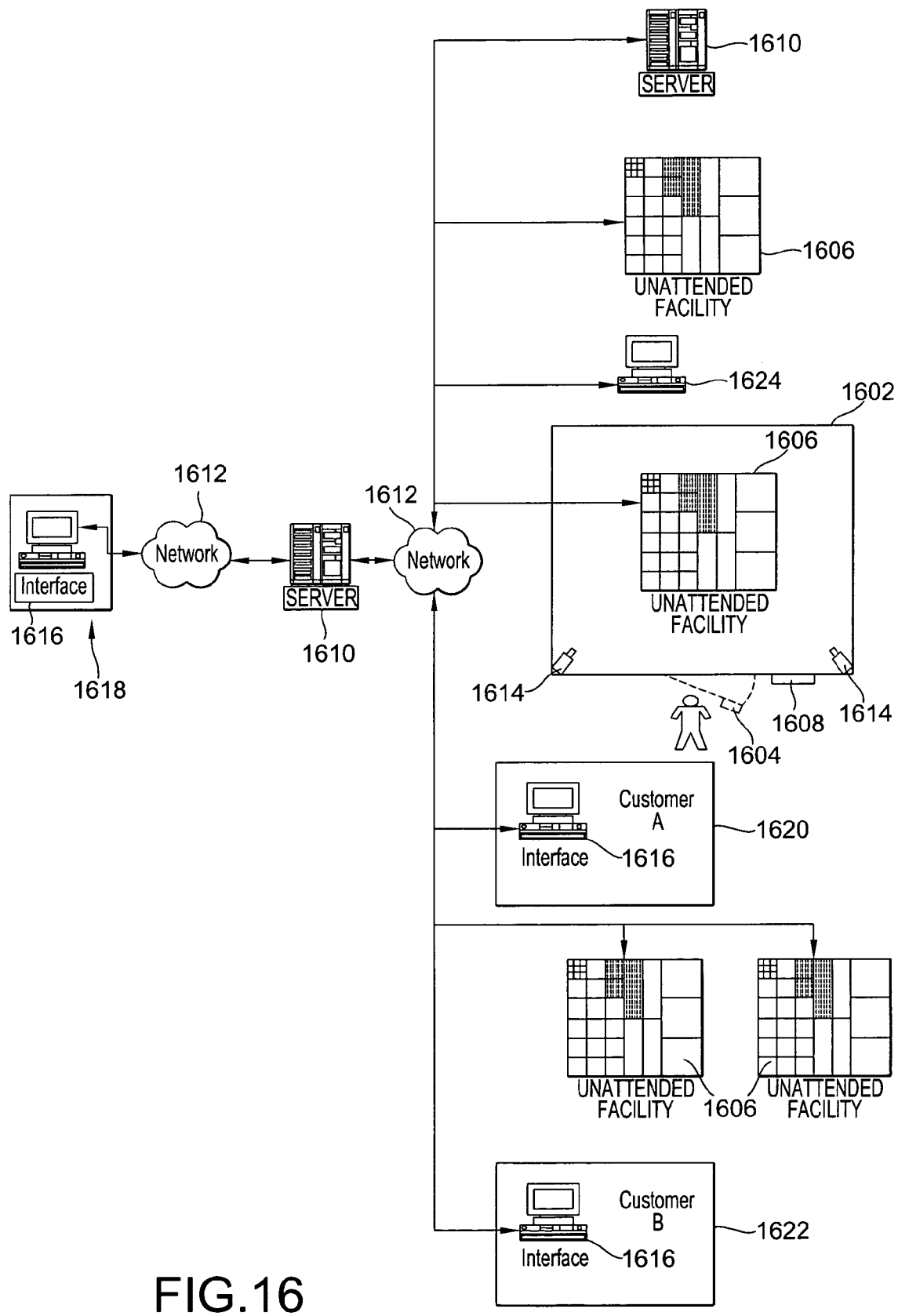
FIG. 16 is a diagrammatic representation of an exemplary overview of the system in an embodiment of the invention.

FIG. 16 is a diagrammatic overview of the system in an embodiment of the invention. The system is comprised of one or more central servers (1610) that may be connected by a network (1612). These central servers (1610) communicate with one or more unattended facilities (1606) via the network (1612). Information about the unattended facilities (1606) may be transmitted from the central servers (1610) to one or more interfaces (1616). Further, information and instructions may be transmitted from an interface (1616) to the central server (1610). Some instructions may be transmitted to the unattended facility (1606) for control and access purposes, such as, for example, programming the data entry device (218) with a passcode. An interface (1616) may be located at a site controlled by the inventory management service (1618), at customer sites (1620, 1622), or at other locations where convenient. Interfaces (1616) need not be stationary, as a wireless network would allow the use of a mobile interface (1616). The inventory management service may control the information that is provided to an interface (1616) at a customer's site (1620, 1622) through software, hardware and other means. The inventory management service may also control the instructions that may be recognized by the central server (1610) from an interface (1616) located at a customer site (1620, 1622) in this manner.

Inventory information about items delivered directly to an unattended facility (1606) may be entered in the data entry device (218), or, in some instances, a separate data entry device (1624) may be associated with the unattended facility (1606). This separate data entry device (1624) may communicate directly with the central server (1610) via the network (1612), or in other embodiments (not shown) they may communicate through the processors (308) of the unattended facility (1606).

There may be multiple unattended facilities (1606) located at a single location depending upon inventory or customer requirements. These multiple unattended facility (1606) installations may supply one or more customers (1620, 1622), and may be located for convenient access by the multiple customers (1620, 1622).

In one embodiment, one or more unattended facilities (1606) may be located in a larger room, building or secure area (1602). Access to the larger building, room or secure area (1602) may be controlled by an electronic lock (1604) that is actuated by one or more processors. These may be the same processors (308) that are used to control the unattended facility (1606) or they may be separate processors that are associated with and connected to the unattended facility processors (308). A person will enter an access code, passcode or have information scanned or read such as, for example, magnetic or radio frequency media into a lock data entry device (1608) that is associated with the electronic lock (1604) in order to gain access to the larger building, room or secure area (1602) containing the unattended facility (1606). Such access may be monitored by the processors (308) of the unattended facility (1606) and transmitted to the central server (1610) via the network (1612). Also, in some embodiments, the larger building, room or secure area (1602) may have one or more video cameras (1614), such as, for example, a web-cam as previously described, so that the inventory management service or the customer may visually monitor the area or unattended facility (1606) transactions may be videographically recorded.

Therefore, the described invention provides systems utilizing unattended facilities that are remote from a central warehouse yet monitored, maintained and stocked by an inventory management service. Such systems may be located in close proximity to one or more customers of the inventory management service such that the delay caused by retrieving or returning parts by such customers is minimized. Furthermore, locating the unattended facilities in close proximity to more than one customer provides a method whereby the multiple customers located nearby may conveniently pool their inventory of parts thus reducing each customer's total individual inventory costs. Finally, unattended drop off facilities located remotely from a central warehouse provide a convenient method for a customer to return unused, used, or damaged parts and begins processing of the returned part so that handling and disposition of the return part is expedited.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for the unattended distribution of items, comprising:
    an unattended facility located remote from a central warehouse and capable of containing a plurality of items;
    a network;
    a central server connected to the unattended facility via the network, wherein said central server is configured to transmit a notification to a customer about an ordered item, said notification including a passcode that is associated with one or more groups of passcodes, said one or more groups of passcodes having a first group of passcodes having authorization to only view and selectively choose items assigned to the passcode used to access the unattended facility, and a second group of passcodes comprised of one or more passcodes that have authorization to view and selectively choose one or more items that have not been assigned to any certain passcode, and each group of passcodes is a subset of all passcodes; and
    an interface connecting an inventory management service to the central server through the network, said interface configured to enable an exchange of information between the inventory management service and the unattended facility, whereby the inventory management service is facilitated in keeping an inventory of the items in the unattended facility or retrieving returned items from said unattended facility.

2. The system of claim 1, wherein the unattended facility further comprises:
    a secure enclosure including a door with a lock;
    a data entry device; and
    a processor programmed to lock or unlock the lock on the door when the passcode is entered into the data entry device.

3. The system of claim 2, wherein the processor is capable of being programmed with one or more passcodes by information entered into the data entry device and by information entered by the inventory management service.

4. The system of claim 2, wherein the processor is further configured to respond to the entry of the passcode and unlock the secure enclosure when a customer enters the passcode into the data entry device of the unattended facility to enable the customer, upon gaining access to the secure enclosure, to retrieve items from the unattended facility from the inventory of items maintained in the unattended facility by the inventory management service.

5. The system of claim 4 further comprising a communications device associated with the network wherein the communications device is used by a customer to place an order for the items with the inventory management service and the items are then delivered to the unattended facility by the inventory management service.

6. The system of claim 5, wherein the items that comprise the order are placed in more than one secure enclosure of the unattended facility and the central server transmits a single notification to the customer that the order had been placed in the unattended facility.

7. The system of claim 2, wherein the processor is configured to monitor a quantity of items placed in or removed from the inventory of items in the unattended facility and to send said quantity to the central server via the network, and said quantity is maintained on the central server and is accessible at the interface.

8. The system of claim 2, wherein said one or more groups of passcodes is further comprised of one or more passcodes that have authorization to view and selectively choose one or more items that have been assigned to a passcode not used to access the unattended facility, and each group of passcodes is a subset of all passcodes.

9. A system for the unattended distribution of items, comprising:
    an unattended facility located remote from a central warehouse and capable of containing a plurality of items, said unattended facility further comprised of;
    a secure enclosure including a door with a lock;
    a data entry device;
    a processor programmed to lock or unlock the lock on the door when a passcode is entered into the data entry device, wherein said passcode is associated with at least one or more groups of passcodes, said one or more groups of passcodes comprised of a first group of passcodes having authorization to view and selectively choose items assigned to the passcode used to access the unattended facility, and a second group of passcodes comprised of one or more passcodes that have authorization to view and selectively choose one or more items that have not been assigned to any certain passcode, and each group of passcodes is a subset of all passcodes;
    a network;
    a central server connected to the unattended facility via the network; and
    an interface connecting an inventory management service to the central server through the network, said interface configured to enable an exchange of information between the inventory management service and the unattended facility, whereby the inventory management service is facilitated in keeping an inventory of the items in the unattended facility or retrieving returned items from said unattended facility.

10. The system of claim 9, wherein the processor is capable of being programmed with one or more passcodes by information entered into the data entry device and by information entered by the inventory management service.

11. The system of claim 9 further comprising a communications device associated with the network wherein the communications device is used by a customer to place an order for the items with the inventory management service and the items are then delivered to the unattended facility by the inventory management service.

12. The system of claim 9, wherein the items that comprise the order are placed in more than one secure enclosure of the unattended facility and the central server transmits a single notification to the customer that the order had been placed in the unattended facility.

13. The system of claim 9, wherein the processor is configured to monitor a quantity of items placed in or removed from the inventory of items in the unattended facility and to send said quantity to the central server via the network, and said quantity is maintained on the central server and is accessible at the interface.

14. The system of claim 9, wherein said one or more groups of passcodes is further comprised of a third group of passcodes having one or more passcodes that have authorization to view and selectively choose one or more items that have been assigned to a passcode not used to access the unattended facility, and each group of passcodes is a subset of all passcodes.

15. A control system for an unattended facility comprising:
   a software application configured to monitor the placement of one or more items that comprise an order in more than one secure enclosures of the unattended facility associated said items as comprising one order; and
   a transmission device capable of transmitting a notification to a customer relating to all the items that comprises the order in response to a signal from the software application, wherein said notification includes a passcode that is used to access said unattended facility, said passcode is associated with at least one or more groups of passcodes, said one or more groups of passcodes comprised of a first group of passcodes having authorization to view and selectively choose orders assigned to the passcode used to access the unattended facility, and a second group of passcodes comprised of one or more passcodes that have authorization to view and selectively choose one or more orders that have not been assigned to any certain passcode, and each group of passcodes is a subset of all passcodes.

16. The control system of claim 15, wherein said one or more groups of passcodes is further comprised of a third group of passcodes having one or more passcodes that have authorization to view and selectively choose one or more orders that have been assigned to a passcode not used to access the unattended facility, and each group of passcodes is a subset of all passcodes.

17. The control system of claim 15, wherein the notification is selected from the group consisting of an electronic page to a wireless electronic paging device, an electronic mail message sent to the customer, and a telephonic transmission sent to the customer.

18. The control system of claim 15, wherein the notification is a single notification.

19. A system for the unattended return of a return item, comprising:
   an unattended facility located remote from a central warehouse, said unattended facility comprising:
      one or more secure enclosures with each secure enclosure having a door with a lock;
      a data entry device; and
      a processor, wherein the processor is configured to lock or unlock the lock on the door when a passcode is entered into the data entry device and said processor is configured to monitor receipt of return information about the return item that has been entered into the data entry device by a customer and to send the information to the inventory management service, said return information including a status of said return item that indicates whether said return items us used, unused, good, bad, damaged or warranty return;
   a network;
   a central server connected to the unattended facility via the network; and
   an interface connecting an inventory management service to the central server, wherein the return information is transmitted to the central server via the network and is available at the interface, said return information being available to the inventory management service to process the return item in advance of its retrieval by the inventory management service and transportation to the central warehouse.

20. The system of claim 19, wherein upon the customer entering the return information into the data entry device, the processor is configured to associate the return item with a return identifier and unlock a secure enclosure of the unattended facility for placement of the return item in the secure enclosure.

21. The system of claim 19, wherein the unattended facility further comprises a device for creating the return identifier.

22. The system of claim 19, wherein the unattended facility further comprises a device for encoding the return identifier.

23. The system of claim 19, wherein the unattended facility further comprises a receipt and a device for creating a receipt for the return item placed in the secure enclosure of the unattended facility.

24. The system of claim 19, wherein the one or more secure enclosures is selected from the group consisting of lockers, rooms, bins and secure areas.

25. The system of claim 19, said return information being available to the inventory management service to process the return item in advance of its retrieval by the inventory management service and transportation to the central warehouse includes indicating whether said return item is defective but still under a warranty.

26. The system of claim 19, said return information being available to the inventory management service to process the return item in advance of its retrieval by the inventory management service and transportation to the central warehouse includes indicating whether to make a replenishment order of said return item based in part upon said status of said return item.

27. The system of claim 19, said return information being available to the inventory management service to process the return item in advance of its retrieval by the inventory management service and transportation to the central warehouse includes generating bills or billing information associated with said return item based in part upon said status of said return item.

28. The system of claim 19, said return information being available to the inventory management service to process the return item in advance of its retrieval by the inventory management service and transportation to the central warehouse includes generating reports based in part upon said return information.

29. The system of claim 19, said return information being available to the inventory management service to process the return item in advance of its retrieval by the inventory management service and transportation to the central warehouse includes pre-processing of a defective return item including determining whether to scrap or repair said defective return item based in part upon said status of said return item.

30. A system for inventory management utilizing unattended facilities comprising:
a plurality of unattended facilities located remote from a central warehouse, each unattended facility including at least one secure enclosure with each secure enclosure having a door and a lock on the door, a processor, and a data entry device, wherein a customer enters a passcode in the data entry device to gain access to the secure enclosures, said passcode is associated with at least one or more groups of passcodes, said one or more groups of passcodes comprised of a first group o passcodes having authorization to view and selectively choose one or more inventory items assigned to the passcode used to access the unattended facility, and a second group of passcodes comprised of one or more passcodes that have authorization to view and selectively choose one or more inventory items that have not been assigned to any certain passcode, and each group of passcodes is a subset of all passcodes;
a central server wherein each unattended facility is connected to the central server through a network; and
an interface with an inventory management service with said interface connected to the central server through the network, wherein a customer is provided access to the secure enclosures to retrieve the inventory item or place a return item, and information about each said access at said plurality of unattended facility is transmitted to the central server and is available at the interface.

31. The system of claim 30, wherein the customer receives a notification prior to retrieving the inventory item from one of the unattended facilities.

32. The system of claim 31, wherein the notification includes the passcode.

33. The system of claim 30, wherein the customer enters return information into the data entry device when placing a return item in the secure enclosure.

34. The system of claim 33, wherein the return information is transmitted to the central server and is made available to the interface.

35. The system of claim 33, wherein the customer associates the return item with a return identifier and said return item is placed in the secure enclosure of one of the unattended facilities.

36. The system of claim 35, further comprising a device at the unattended facility, wherein the return identifier is created by the device.

37. The system of claim 33, further comprising a receipt device at the unattended facility, wherein the receipt device creates a receipt for the return item.

38. The system of claim 30, wherein based upon the return information entered by the customer, a return item is assigned a status and responsive to said status being a predetermined status, the return item is designated as an inventory item in one of the unattended facilities.

39. The system of claim 30, wherein said one or more groups of passcodes is further comprised of a third group of passcodes having one or more passcodes that have authorization to view and selectively choose one or more inventory items that have been assigned to a passcode not used to access the unattended facility, and each group of passcodes is a subset of all passcodes.

40. A method for notifying a customer of delivery of an order to an unattended facility comprising:
receiving the order from the customer, said order comprised of more than one item;
delivering the order to the unattended facility;
placing the items that comprise the order in more than one secure enclosures of the unattended facility; and
transmitting a notification relating to all the items of the order to the customer that the order is available for retrieval, wherein said notification includes a passcode that is used to access to the secure enclosures of said unattended facility, said passcode is associated with at least one or more groups of passcodes, said one or more groups of passcodes comprised of a first group of passcodes having authorization to view and selectively choose orders assigned to the passcode used to access the unattended facility, and a second group of passcodes comprised of one or more passcodes that have authorization to view and selectively choose one or more orders that have not been assigned to any certain passcode, and each group of passcodes is a subset of all passcodes.

41. The method of claim 40, wherein the notification is selected from the group consisting of an electronic page to a wireless electronic paging device, an electronic mail message sent to the customer, and a telephonic transmission sent to the customer.

42. The method of claim 40, wherein the enclosure is selected from the group consisting of lockers, rooms, bins and secure areas.

43. The method of claim 40 further comprising indicating to the customer in which secure enclosures the items that comprise the order have been placed.

44. The system of claim 40, wherein said one or more groups of passcodes is further comprised of a third group of passcodes having one or more passcodes that have authorization to view and selectively choose one or more orders that have been assigned to a passcode not used to access the unattended facility, and each group of passcodes is a subset of all passcodes.

45. A method for the unattended distribution and retrieval of returned items by an inventory management service, comprising:
providing an unattended facility comprised of at least one secure enclosure at a location that is remote from a central warehouse and that is geographically closer to a plurality of customers of the inventory management service than is said central warehouse;
determining from each of the customer's businesses one or more certain service parts, wherein at least one of said service parts is a pooled service part needed by each of the plurality of customers on a random, non-continual basis and said one or more service parts comprise a pooled inventory of items that are to be placed in the unattended facility;
placing and maintaining said pooled inventory of items in said unattended facility, wherein said pooled inventory of items includes said pooled service part and said quantity of said pooled service part maintained in said unattended facility is less than or equal to said plurality of customers; and
allowing said plurality of customers to access and obtain one or more items from the pooled inventory of items, as needed.

46. A method for the unattended distribution and retrieval of returned items by an inventory management service, comprising:
providing an unattended facility comprised of at least one secure enclosure at a location that is remote from a central warehouse and that is geographically closer to a plurality of customers of the inventory management service than is said central warehouse;

determining from the unattended facility's proximity to each of the plurality of customer's businesses one or more certain service parts, wherein at least one of said service parts is a pooled service part needed by each of the plurality of customers on a random, non-continual basis and said one or more service parts comprise a pooled inventory of items that are to be placed in the unattended facility;

placing and maintaining said pooled inventory of items in said unattended facility, wherein said pooled inventory of items includes said pooled service part and said quantity of said pooled service part maintained in said unattended facility is less than or equal to said plurality of customers; and allowing said plurality of customers to access and obtain one or more items from the pooled inventory of items, as needed.

* * * * *

UNITED STATES PATENT AND TRADEMARK OFFICE
CERTIFICATE OF CORRECTION

PATENT NO. : 7,055,741 B2
APPLICATION NO. : 11/018789
DATED : June 6, 2006
INVENTOR(S) : Bong et al.

Page 1 of 1

It is certified that error appears in the above-identified patent and that said Letters Patent is hereby corrected as shown below:

Column 37,
Line 17, "facility associated" should read --facility and associate--;
Line 20 and 21, "comprises" should read --comprise--.

Column 39,
Line 11, "o" should read --of--;
Line 27, "facility" should read --facilities--.

Signed and Sealed this

Ninth Day of January, 2007

JON W. DUDAS
*Director of the United States Patent and Trademark Office*